US008503954B2

(12) United States Patent  (10) Patent No.: US 8,503,954 B2
Arlotta  (45) Date of Patent: Aug. 6, 2013

(54) RF DISTRIBUTION SYSTEM, REMOTE CONTROL UNIT AND METHOD OF USING SAME

(75) Inventor: Frank Arlotta, Cherry Hill, NJ (US)

(73) Assignee: R F Products, Inc., Camden, NJ (US)

( * ) Notice: Subject to any disclaimer, the term of this patent is extended or adjusted under 35 U.S.C. 154(b) by 113 days.

(21) Appl. No.: 13/084,881

(22) Filed: Apr. 12, 2011

(65) Prior Publication Data

US 2011/0250914 A1  Oct. 13, 2011

Related U.S. Application Data

(60) Provisional application No. 61/322,964, filed on Apr. 12, 2010.

(51) Int. Cl.
*H04B 7/08* (2006.01)
(52) U.S. Cl.
USPC ......... 455/140; 455/145; 455/230; 455/277.1
(58) Field of Classification Search
USPC ................. 455/129, 566, 133, 140, 145, 146, 455/154.1–154.2, 170.1, 230, 277.1
See application file for complete search history.

(56) References Cited

U.S. PATENT DOCUMENTS

| | | | | |
|---|---|---|---|---|
| 6,064,861 | A * | 5/2000 | Riley et al. | 455/67.13 |
| 6,151,354 | A | 11/2000 | Abbey | |
| 6,570,867 | B1 | 5/2003 | Robinson et al. | |
| 7,187,945 | B2 | 3/2007 | Ranta et al. | |
| 7,260,363 | B1 | 8/2007 | Snodgrass | |
| 7,382,185 | B1 | 6/2008 | Sternowski | |
| 7,636,554 | B2 | 12/2009 | Sugar et al. | |
| 7,715,722 | B1 | 5/2010 | Hoke et al. | |
| 7,720,506 | B1 | 5/2010 | Gribble | |
| 2002/0186665 | A1 | 12/2002 | Chaffee et al. | |
| 2004/0162107 | A1 | 8/2004 | Klemetti et al. | |
| 2005/0085201 | A1 | 4/2005 | Martin et al. | |
| 2006/0256754 | A1 | 11/2006 | Liu et al. | |
| 2007/0021080 | A1 | 1/2007 | Kuriyama et al. | |
| 2007/0178839 | A1 | 8/2007 | Rezvani et al. | |
| 2008/0002670 | A1 | 1/2008 | Bugenhagen et al. | |
| 2009/0170444 | A1 | 7/2009 | Retnasothie et al. | |
| 2010/0080177 | A1 | 4/2010 | Rofougaran | |
| 2010/0105425 | A1 | 4/2010 | Asokan | |
| 2010/0120466 | A1 | 5/2010 | Li | |
| 2010/0138824 | A1 | 6/2010 | Cho et al. | |
| 2011/0006841 | A1 | 1/2011 | Wyse et al. | |
| 2011/0021135 | A1 | 1/2011 | Broski et al. | |

* cited by examiner

*Primary Examiner* — Christian Hannon
(74) *Attorney, Agent, or Firm* — Gregory J. Winsky; Archer & Greiner, P.C.

(57) ABSTRACT

A system for configuring communication paths in a radio communications system including a plurality of radios, a plurality of antennas and radio frequency distribution communications equipment in communication with the plurality of radios and antennas. The configuring system includes at least one of (1) a graphical user interface display window including a list of radios and a list of paths by which the radios communicates with the antennas via the radio frequency distribution communications equipment, and (2) a block diagram including a plurality of radios, a plurality of antennas and paths by which the plurality of radios communicates with the plurality of antennas via the radio frequency distribution communications equipment. The system further includes means for changing at least one path displayed in at least one of the display window and the block diagram. Also disclosed are methods for implementing the system.

24 Claims, 24 Drawing Sheets

| RCU PATH NAME LEGEND (PAGE 1 OF 2) |||
|---|---|---|
| ANTENNA RCU DESIGNATION | ANTENNA LOCATION | ANTENNA FREQ. RANGE |
| 1H | FS XXX TOP HIGH ANGLE | 225-400 MHz |
| 1L | FS XXX TOP LOW ANGLE | 225-400 MHz |
| 2H | FS XXX TOP HIGH ANGLE | 225-400 MHz |
| 2L | FS XXX TOP LOW ANGLE | 225-400 MHz |
| 3H | FS XXX TOP HIGH ANGLE | 225-400 MHz |
| 3L | FS XXX TOP LOW ANGLE | 225-400 MHz |
| B1 | FS XXX BOTTOM | 30-174 MHz |
| B2 | FS XXX BOTTOM | 225-512 MHz |
| B3 | FS XXX BOTTOM | 512-941 MHz |
| B4 | FS XXX BOTTOM | 30-174 MHz |
|  | FS XXX BOTTOM | 225-512 MHz |
| B6 | FS XXX BOTTOM | 512-941 MHz |

| RCU PATH NAME LEGEND (PAGE 2 OF 2) ||| 
|---|---|---|
| RADIO RCU DESIGNATION | RADIO | RADIO FREQ. RANGE |
| CT1 | SATCOM RX | 243-270 MHz |
| CT2 | SATCOM RX | 243-270 MHz |
| U6 | RT-xxxx TX/RX FULL DUPLEX | 225-400 MHz |
| VU3 | ARC-2xx | 30-512 MHz |
| VU4 | ARC-2xx | 30-512 MHz |
| VU5 | ARC-2xx | 30-512 MHz |
| VU6 | ARC-2xx | 30-512 MHz |
| VU7 | ARC-2xx | 30-512 MHz |
| FREQ. RANGE PATH DESIGNATION | PATH FREQ. RANGE ||
| S | 243-270 AND 292-318 MHz (Dedicated Channel SATCOM) ||
| M | MUOS ||
| U | 225-400 MHz ||
| V | 30-88 AND 108-174 MHz, includes SINCGARS ||
| Z | 225-512 MHz ||
| W | 512-941 MHz ||
| Tx AND/OR Rx PATH DESIGNATION | PATH FUNCTION ||
| T | TRANSMIT ONLY ||
| R | RECEIVE ONLY ||
| X | TRANSMIT AND RECEIVE (Note that full duplex or half duplex function is not indicated.) ||
| H | Hopping Mode (Have Quick), also functions in non-hopping mode. ||

FIG. 9

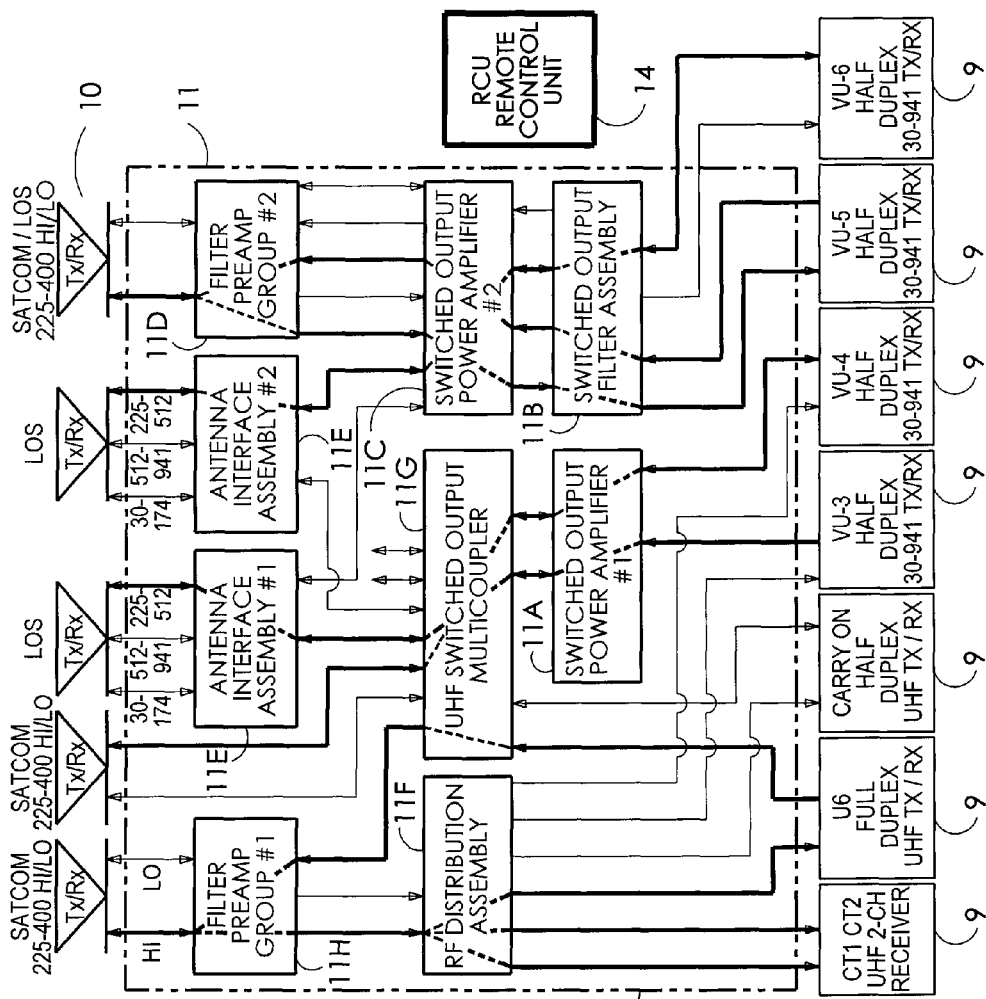
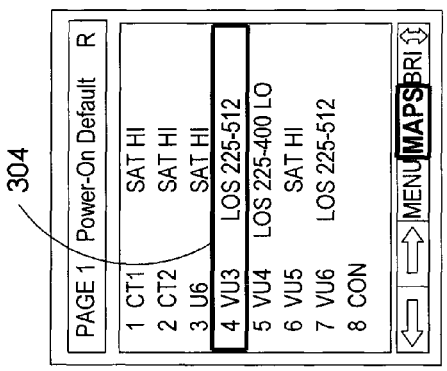
FIG. 15

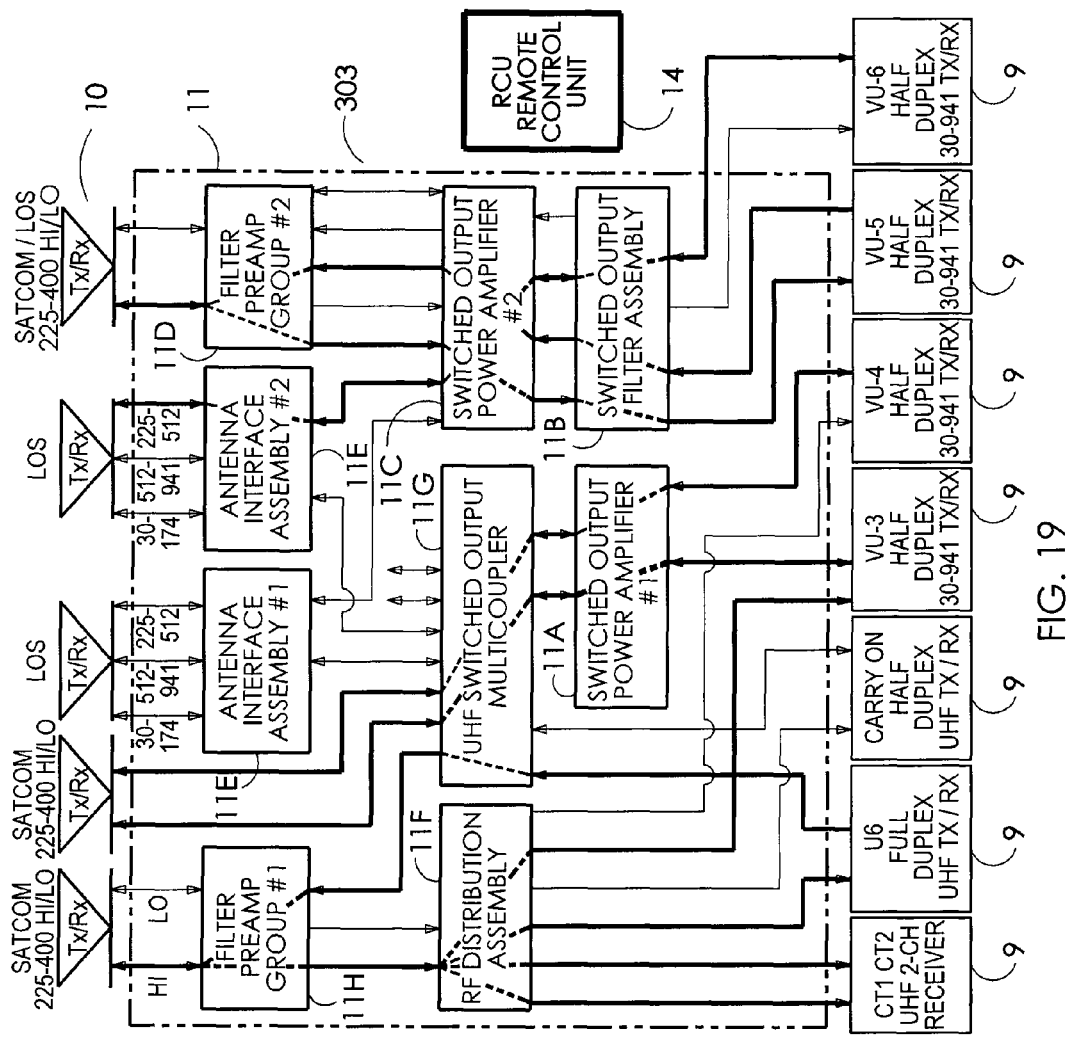
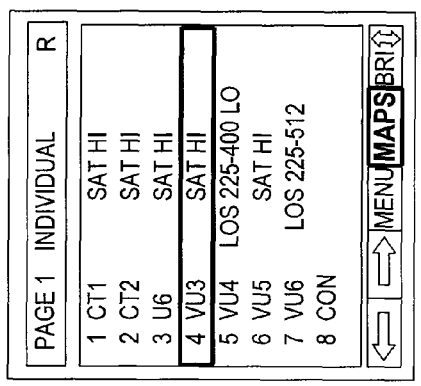
FIG. 19

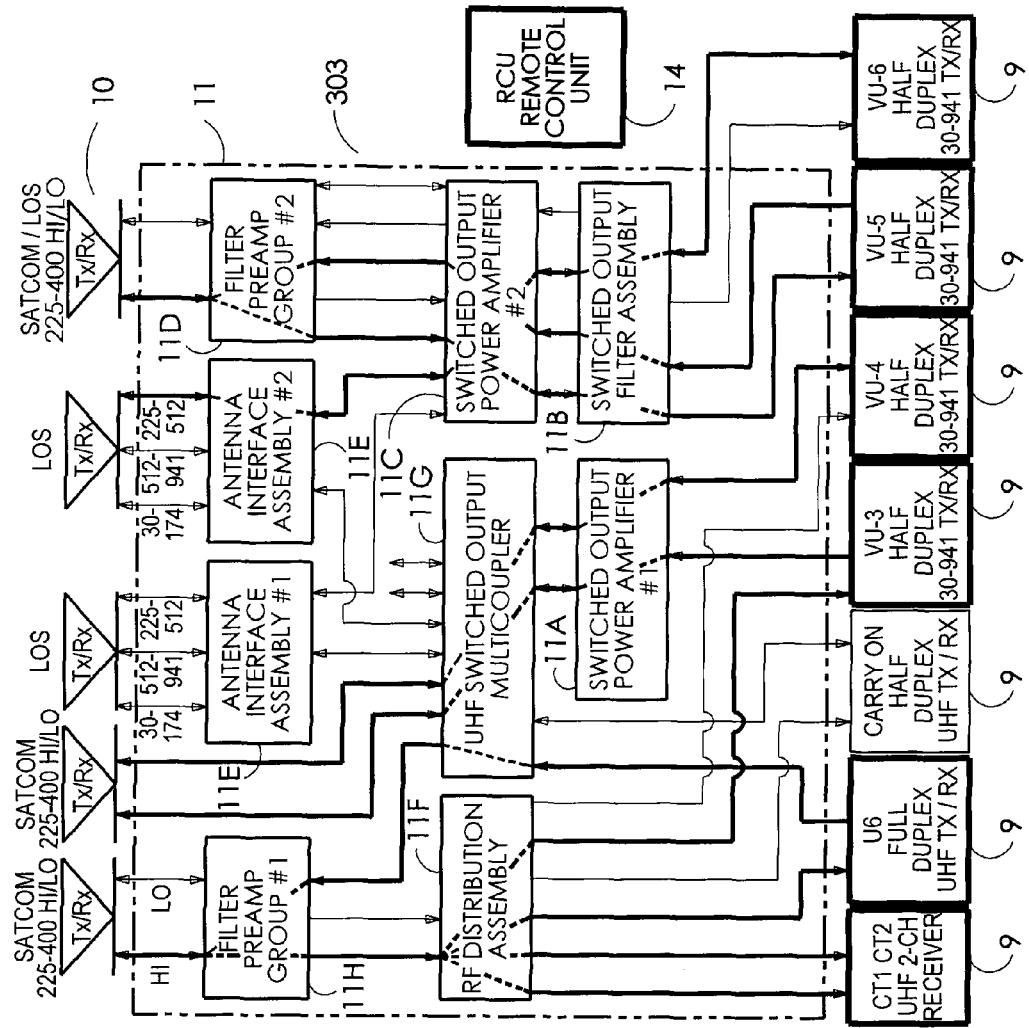
FIG. 21
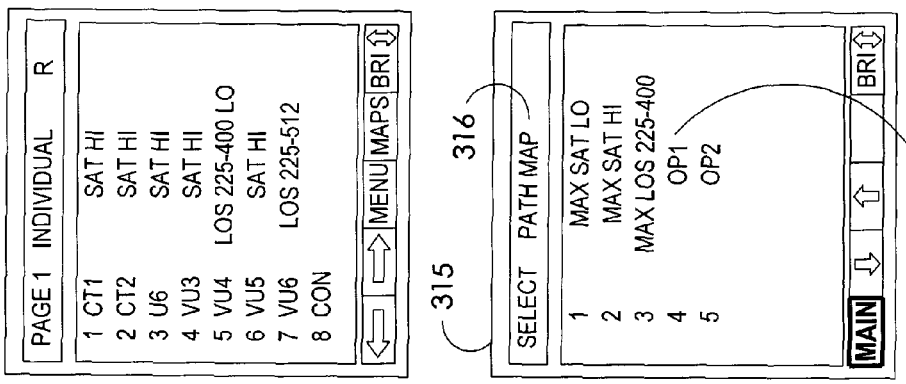

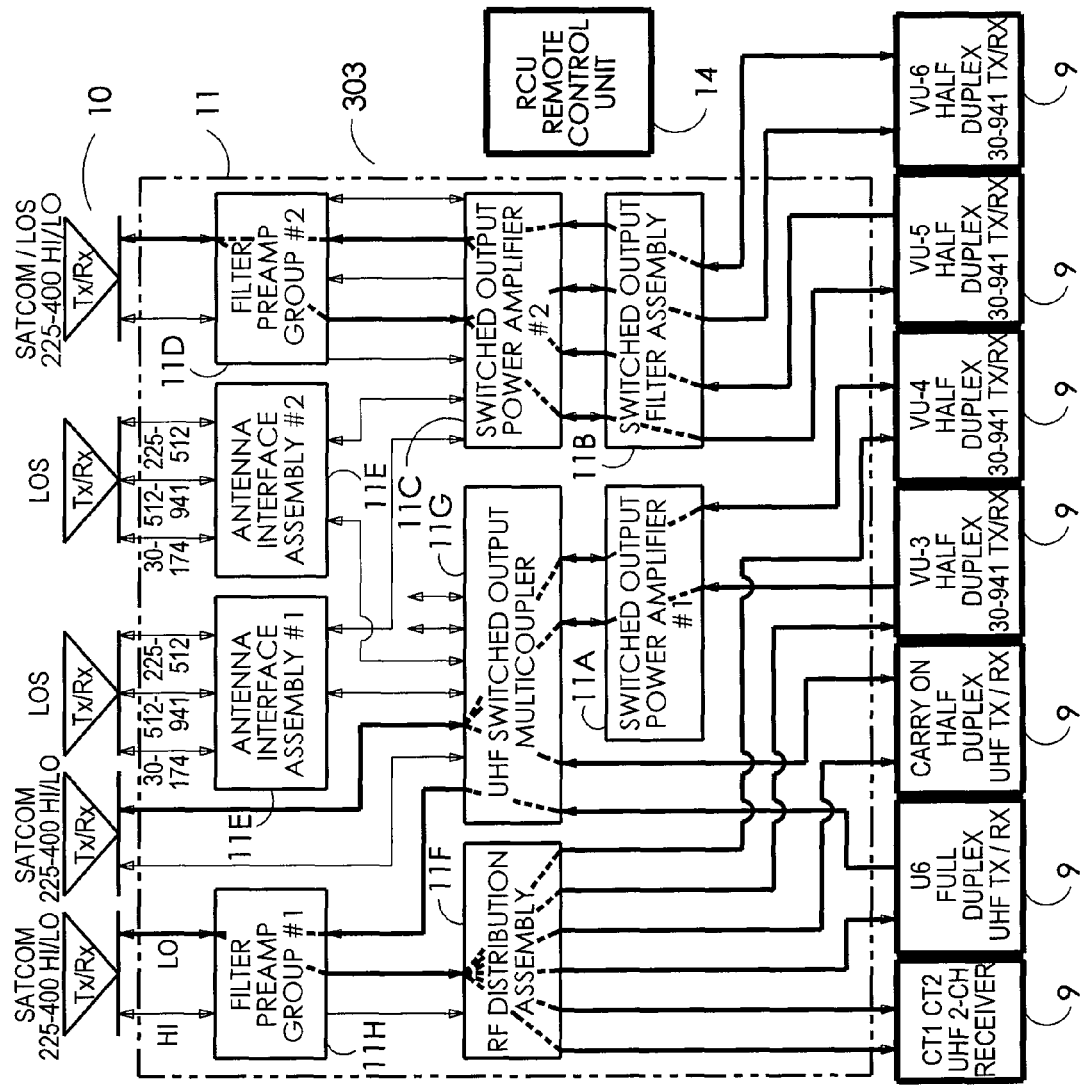
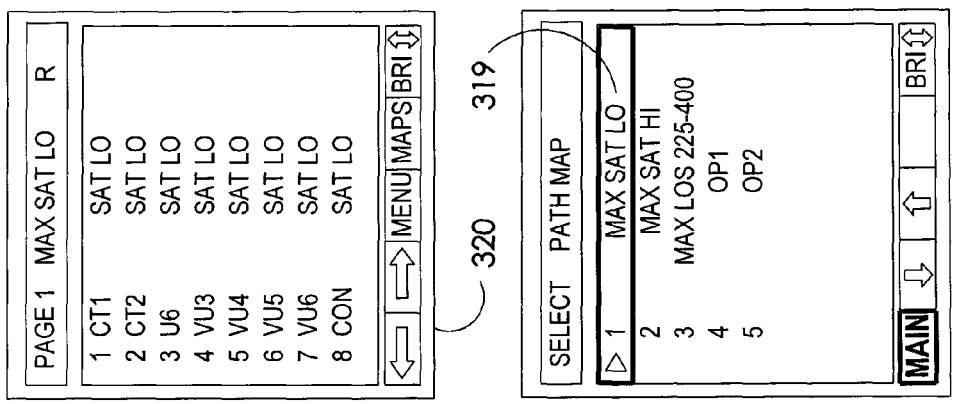
FIG. 23

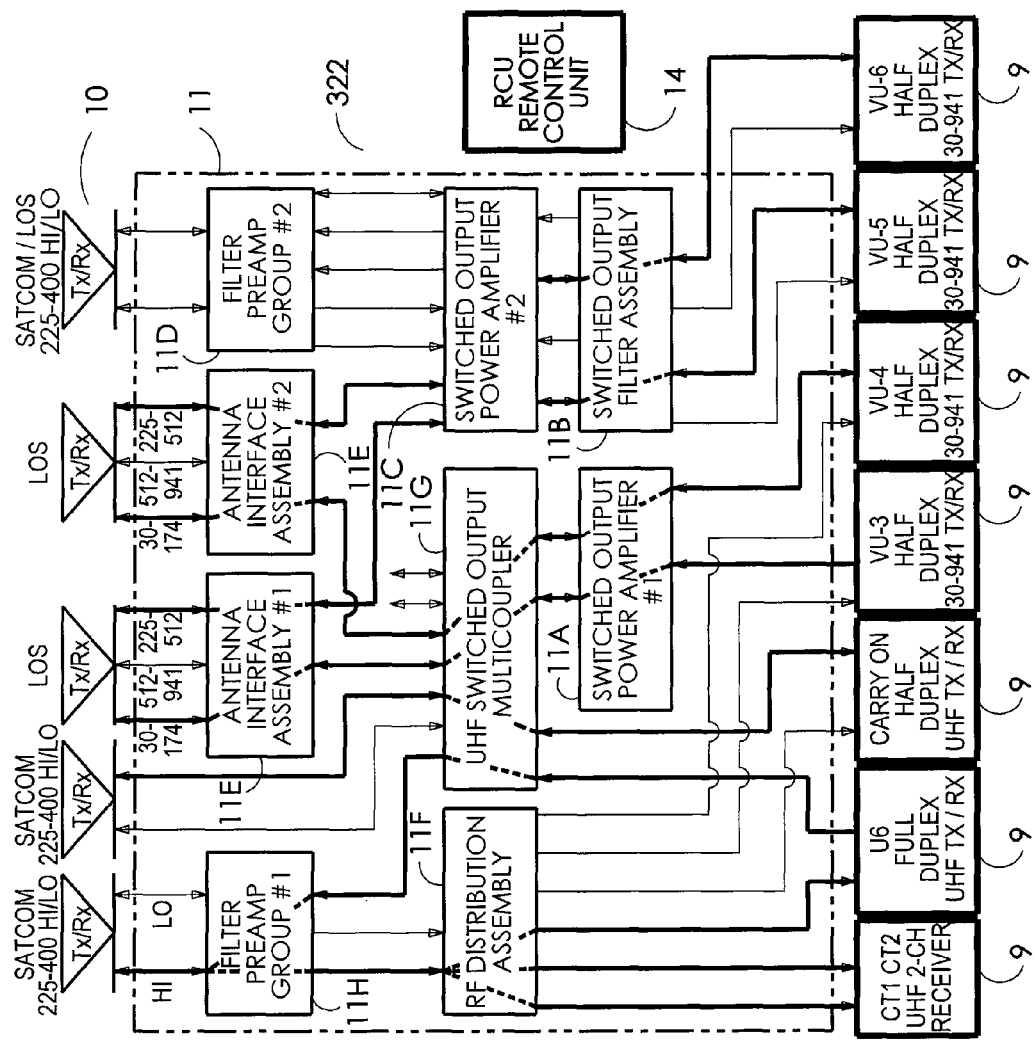
FIG. 26
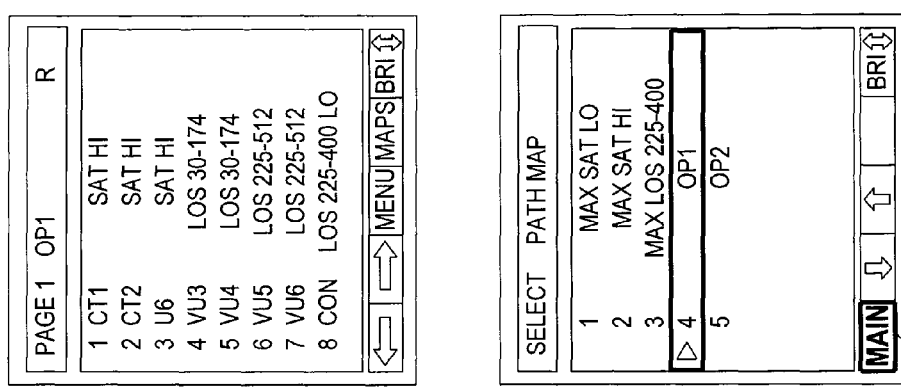

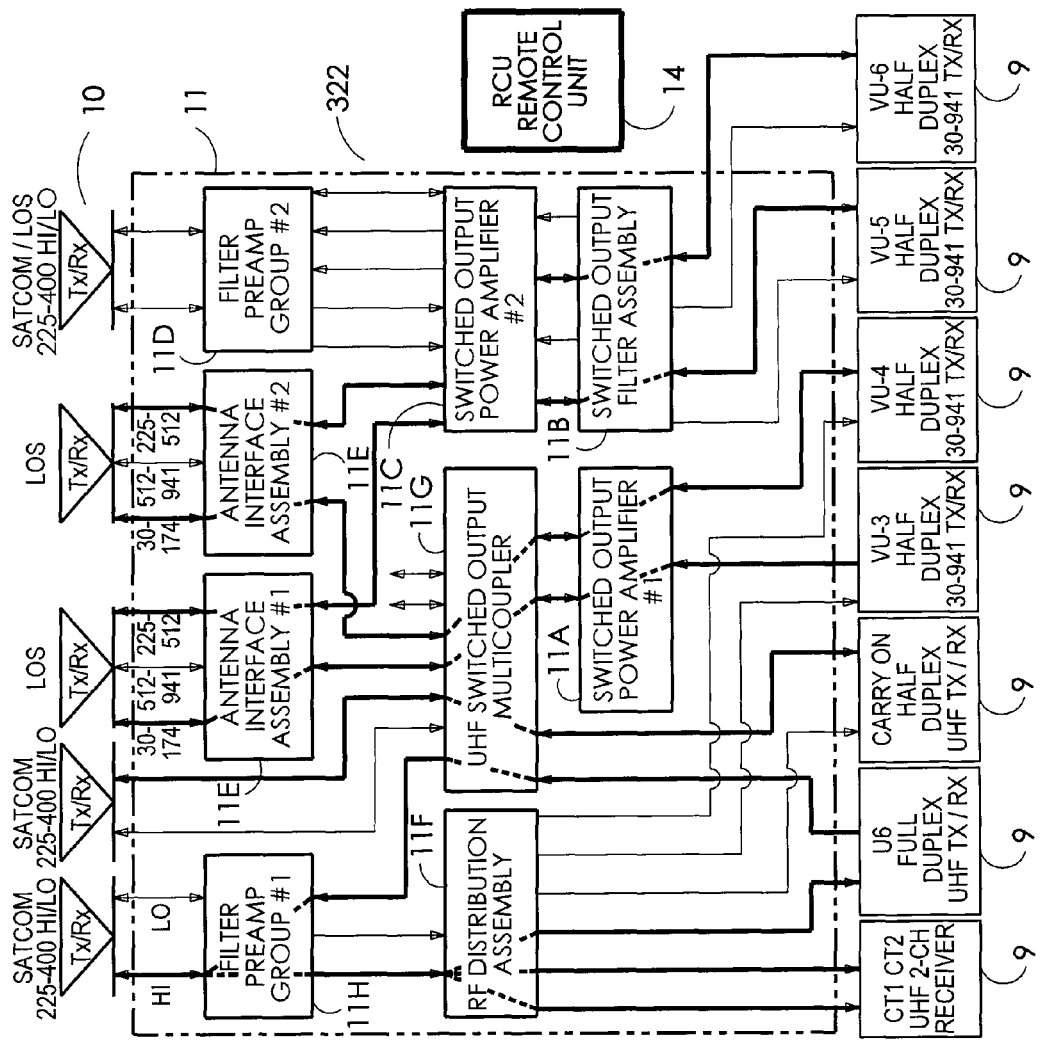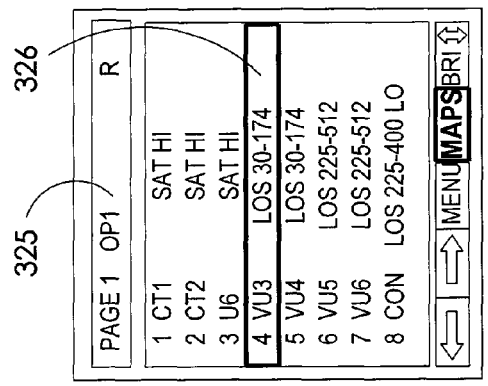
FIG. 27 ated Apr. 12, 2010, the disclo-
RF DISTRIBUTION SYSTEM, REMOTE CONTROL UNIT AND METHOD OF USING SAME

CROSS REFERENCE TO RELATED APPLICATION

This application claims the benefit of U.S. Provisional Application No. 61/322,964, filed Apr. 12, 2010, the disclosure of which is incorporated herein in its entirety.

FIELD OF THE INVENTION

The present invention relates in general to radio communications systems and in particular to radio communications systems for use in military, homeland security, first responder, civil agency, and related applications.

BACKGROUND OF THE INVENTION

Lessons learned in both the global war on terror and in the Haitian humanitarian missions in 2010 dictate the need for additional radio communications capabilities on aircraft and other military equipment. In Haiti, United States Navy aircraft were the first on the scene to identify critically damaged areas, accumulations of victim populations, landing areas, and land routes to reach victims. A similar mission was undertaken following the unfortunate earthquake and tsunami in Japan in 2011. Flexibility of aircraft and other military communication systems is vital for effective performance of these types of missions.

However, current radio communications are no longer capable of meeting worst-case humanitarian and/or hostile environment coordination activities. In humanitarian missions, improvements are needed to ensure the speed and accuracy of distributing help to victims. In hostile environment missions, improvements are required to ensure the safety of ground personnel and prevent unplanned events such as fratricide, wrong target hits, civilian casualties, etc., while at the same time conducting planned mission operations. Unfortunately, humanitarian needs and hostile opposition can also happen simultaneously thereby presenting additional challenges for military forces. These challenges would be best met through improvements and increases in aircraft communications capabilities which would require an upgrade to existing radios and radio frequency (RF) distribution systems.

Transceivers that have been in use until the current time have mostly been single band and/or single mode radios. That is, radios operated in only one band, which is only one frequency range, such as 225 to 400 MHz, or 30 to 88 MHz. Radios also operated in only one mode such as in Line of Sight (LOS) mode, or in Satellite (SATCOM) Mode. In this connection, radio frequency distribution (RFD) refers to the means by which radios are connected to their respective antennas so that each radio can transmit and/or receive signals. The RFD for the old generation of single band/single mode radios was referred to as "stove pipe", wherein each radio had its own "vertical stack" (or stove pipe) of connecting cables and other related RF components such as high power amplifiers and tunable bandpass filters up to and including the antennas. Stove piping is a physical constraint in the controls that may be used for the RFD components. For example, the standard UHF shipboard multicoupler used fleetwide by the US Navy and many other navies around the world includes its own control head built into the top front face of the multicoupler. Use of modern multi-mode, multi-band communications requires a departure from the legacy stove pipe approach.

Radio manufacturers have made significant improvements to combine the operations of different bands and modes into single radio units, which units are referred to herein as multi-mode, multi-band (M3B) transceivers. Presently, the ultimate M3B transceiver design achievement is a US Department of Defense (DoD) program known as the Joint Tactical Radio System (JTRS). The original goal for the JTRS program was to reduce procurement and logistics costs by avoiding the practice of each branch of military service (e.g., Army, Navy and Air Force) buying its own distinct radios even though each service shared the same battlespaces and frequency spectra. Another JTRS goal was to have one radio that was software reconfigurable so that the one radio can be used in different bands and modes. These goals have been achieved via the currently produced and fielded M3B radios and via the emerging JTRS-compliant radios. However, still unachieved is full implementation of these radio systems into aircraft, ship and ground communications systems as well as full exploitation of the these new radios in order to realize another of their benefits, namely, multi-mode, multi-band use of each radio on a ship or aircraft or ground system to the maximum extent possible. As will be described in greater detail hereinafter, this goal is most efficiently and effectively achieved, according to the present invention, via a reconfigurable RF distribution that quickly and easily provides the capability to reconfigure the entire radio system for different combinations of bands and modes.

For example, an aircraft mission might begin with a suite of aircraft radios distributed for a certain combination of satellite, air-to-air, and air-to-ground communications. However, during the mission, an emergency may arise in which additional communications links are required between the aircraft and ground forces. In the current state of the art, reconfiguration of radios to different bands and modes is not straightforward, easy or fast. Often the operators are left to transfer radio and RFD operations to different bands and modes via banks of toggle switches. Care must be taken to avoid operator error which can permanently damage radio communications and cause premature termination of the mission. Even if transfer of radios and RFD paths is accomplished via a computer display, the complete array of radio/RFD connections are not displayed in one snapshot, and prevention of operator errors is not built into the software control of the RFD. Therefore, radio assets that could be used for short term emergency diversions from the planned mission are often left unused because it takes too long to change the radio connections to and from the bands and modes needed to address the emergency.

SUMMARY OF THE INVENTION

In the event of an emergency, a properly designed RFD with a properly designed, user-friendly RFD control can be used to immediately and easily reconfigure the radio band/mode connections to provide the largest number of communications links between aircraft and ground forces. Toward that end, the present invention provides such an RFD control system which comprises a remote control unit (RCU) and a RCU/RFD digital dashboard (R2D2). Using the present system, the aircraft radio configuration can be quickly and easily changed back to its original combination of bands and modes via use of the RCU and R2D2 after an emergency is addressed. As used herein, a combination of bands and modes including frequency settings for each radio is called a "Comm Plan" as displayed on the RCU and on the R2D2. When the combination includes bands and modes only and does not include the frequency settings of each radio, it is called a "Path Map" as displayed on the RCU and on the R2D2. The RCU and the R2D2 provide an operator-friendly capability required by modern multi-mode, multi-band communications systems to fully exploit capabilities of modern radios and to fully expand the multi-role capabilities of the communications platforms.

In addition, it is current practice for merchants offering technical proposals relating to communications systems to describe reconfigurability of a communications system via many pages of detailed individual block diagrams. This practice makes it very difficult for a potential customer to fully grasp the layout and operation of the proposed RF distribution system. In contrast, the R2D2 according to the invention not only provides user-friendly functionality for the ultimate operator of the communications system, it enables "samples" of the proposed reconfigurable system to be used as part of a technical proposal that the customer can implement on its own computer whereby the customer receives the benefit of a fully interactive demonstration of the R2D2 operation configured specifically for the customer's required application.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein:

FIG. 9 is a representation of a typical chart that may be used during the design stage of the R2D2/RCU/RFD according to the invention to label and define the radios and character indications used in RFD path names;

FIG. 14 is a representation of the second type of RCU display according to the invention showing how a virtual RCU and an actual, specific radio system block diagram could be displayed in the R2D2, specifically a typical Power-On Default (POD) configuration that might appear when the aircraft comms (including the R2D2/RCU/RFD) are first turned on;

FIG. 15 is a representation of the second type of RCU/R2D2 display showing the first step or "click" of a "3-click" sequence to change the band/mode RFD setting for an individual radio;

FIG. 19 is a representation of the second type of RCU/R2D2 showing the results of the third click performed in FIG. 18;

FIG. 21 is a representation of the second type of RCU/R2D2 display showing the result of the first click to change the "PATH MAP";

FIG. 23 is a representation of the second type of RCU/R2D2 display showing the result of the second click of the 3-click PATH MAP selection sequence;

FIG. 26 is a representation of the second type of RCU/R2D2 display showing the availability of a virtual "MAIN" button; and FIG. 27 is a representation of the second type of RCU/R2D2 display showing the results of the third click on the virtual "MAIN" button.

DETAILED DESCRIPTION OF THE INVENTION

Figure 1:
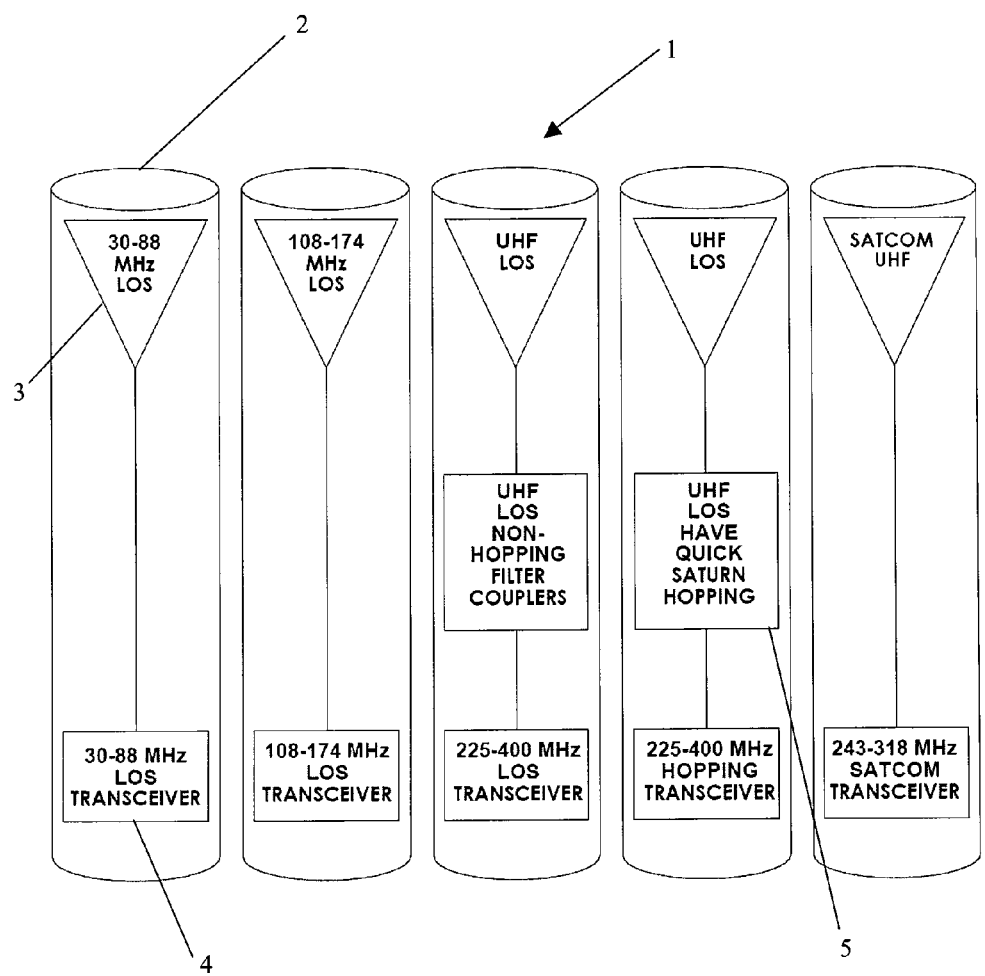
FIG. 1 is a schematic representation of a stovepiped communications system of the prior art populated with old single band/single mode radios.

Heretofore, military and related transceivers have mostly been single band and/or single mode radios. RF Distribution (RFD) refers to the means by which these radios are connected to their respective antennas so that each radio can transmit and/or receive. The RFD for single band/single mode radios is often referred to as "stove pipe". An example of a conventional stove pipe arrangement is shown in FIG. 1 and identified generally by reference numeral 1. In FIG. 1, each radio 4 has its own "vertical stack" (or stovepipe) 2 of connecting cables and other related RF components 5 such as high power amplifiers and tunable bandpass filters up to and including the antenna 3.

Figure 2:
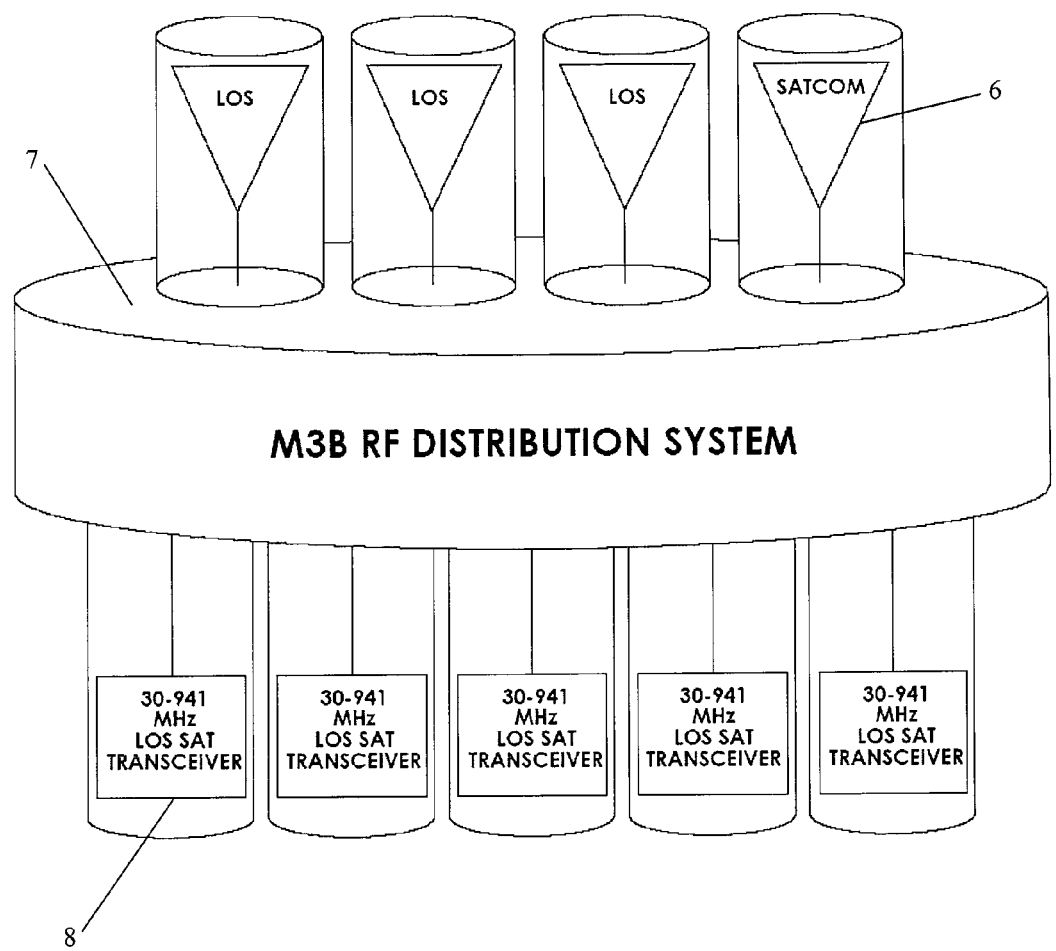
FIG. 2 is a schematic representation of the holistic nature of a modern RF Distribution System.

Since the development of stove pipe assemblies, radio manufacturers have made significant improvements to combine the operations of different bands and modes into single radio units referred to as multi-mode, multi-band (M3B) transceivers. A schematic example of a reconfigurable RF distribution system according to the present invention is shown in FIG. 2 that quickly and easily provides the capability to reconfigure the entire radio system for different combinations of bands and modes. This modern RFD includes the antennas 6, the M3B RF Distribution System 7 and the radios 8.

The present invention relates to the remote control of M3B RF Distribution (RFD), the Remote Control Unit (RCU) and the RCU/RFD Digital Dashboard (R2D2) GUI and software required to control the RFD via the RCU.

Figure 3:
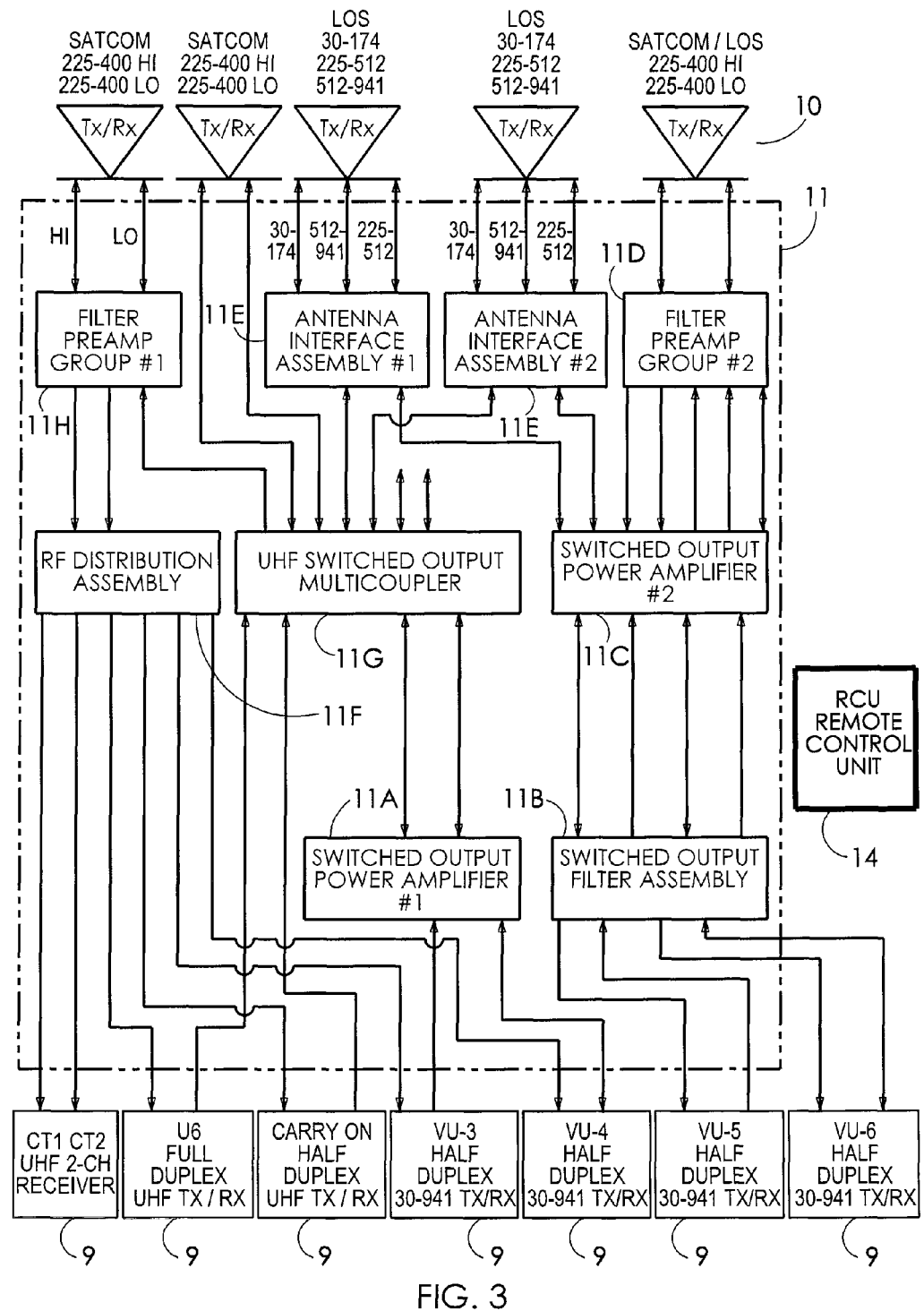
FIG. 3 is a typical RF block diagram for a radio system showing the radios, antennas, and other major components that comprise the RFD as well as all of the RF connections between the radios, antennas and RFD components.

The layout of a typical, but non-limitative, RFD system according to the instant invention is shown in block diagram in FIG. 3 and includes a plurality of radios 9, a plurality of antennas 10, and RF distribution communications equipment disposed between and communicating the radios with the antennas. A typical RF distribution system 11 such as that shown in FIG. 3 may include any combination of the following functions and/or components:

Functions:
Frequency ranges within 1 MHz to 2 GHZ
Reduces antenna population
Enables simultaneous and/or sequential operation of transceivers on antennas
Reduces interference between collocated transceivers
Reduces minimum adjacent channel separation between collocated transceivers
Prevents cross tuning conflicts
Provides low-angle (SATCOM for satellite locations relative to the antenna from horizon to 35 degrees), high-angle (SATCOM for satellite locations relative to the antenna from 35 degrees to vertical) and Line of Sight (LOS) modes of operation with interconnection to multiple antennas
Provides bypass modes of operation for fail-safe operation even in event of complete RFD power failure
Provides rapid receive-transmit and frequency-tuning times for waveform compliant operation.
Includes amplification, as required, to meet line of sight link range requirements
Enables operation of radios in each band and mode of which it is capable, to the maximum extent possible
Includes amplification, as required, to meet satellite communications link margin requirements
Built-in, manual or automatic RF switching for antenna selection Components:
Tunable mechanical filters
Frequency hopping filters
Interference cancellers
Low noise amps
High power amps
Extremely low-loss combining network
Switched output combining networks
RF switching
Built-in patch panels
Remote control tuning interfaces
RF switching control interfaces
Status indication interfaces
Remote control units (RCUs)
M3B control software for aircraft main comms control computer By way of example the RFD components 11 of FIGS. 3 and 4 include: a first switched output power amplifier 11A, a switched output filter assembly 11B, another switched output power amplifier 11C, a filter preamp group 11D, a pair of antenna interface assemblies 11E, an RF distribution assembly 11F, a UHF switched output multicoupler 11G, and another filter preamp group 11H.

Figure 4:
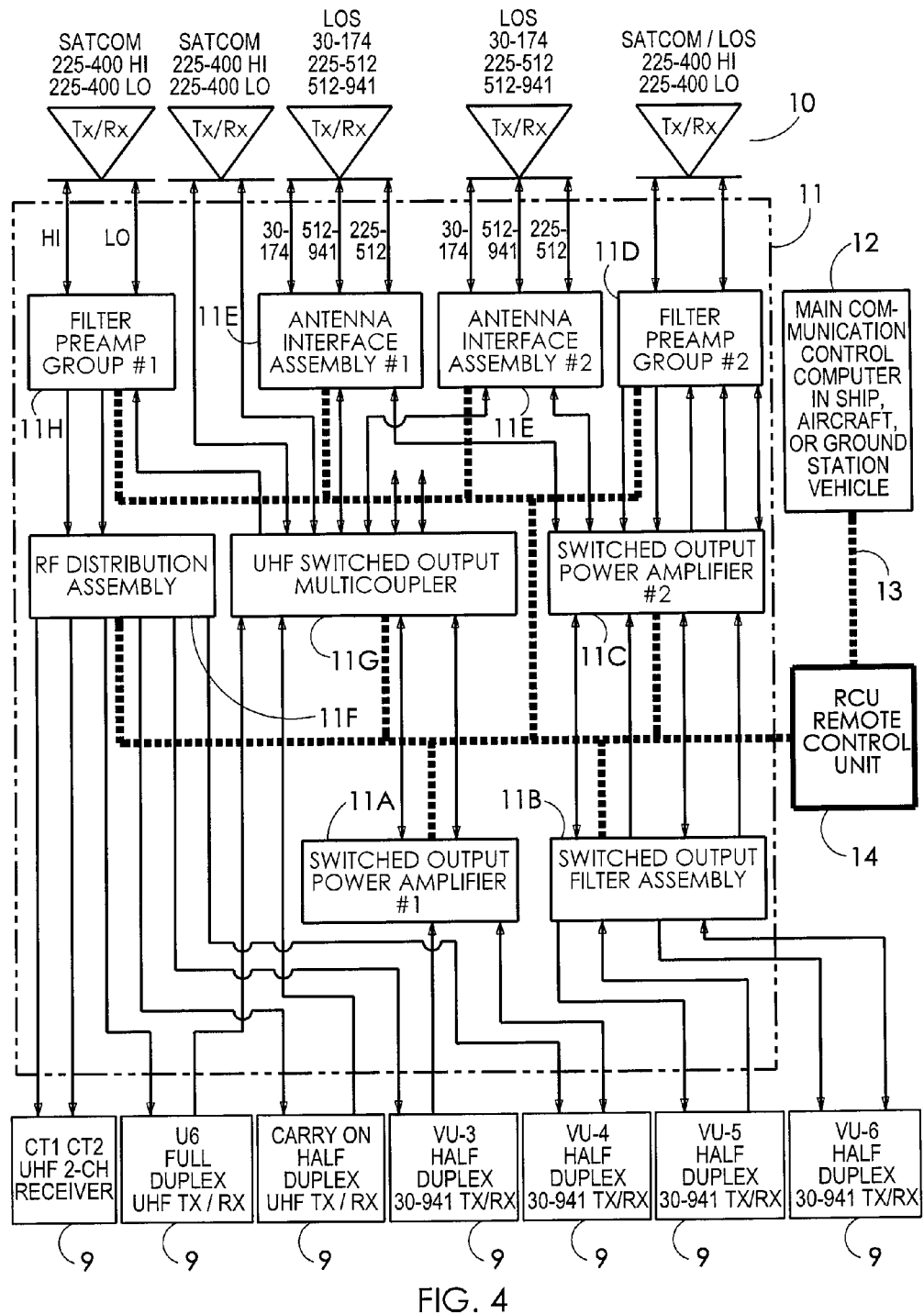
FIG. 4 is a further representation of the RF block diagram of FIG. 3, with the RCU positioned to one side to show typical remote control connections.

As shown in FIG. 4, the R2D2 software would be installed in a main control computer 12 which would have a remote control interface 13 to the RCU 14. The main control computer is not part of the RFD/RCU. The R2D2 graphical user interfaces (GUIs) would be displayed on the main control computer as part of the man-machine interface. The RCU also provides an interface junction between the main control computer and the interfaces required to the RFD individual system components 11 shown in FIG. 3.

The invention provides unique RF Distribution and operator-control capabilities that enable greatly expanded utilization of modern M3B and JTRS radios whereby a military platform (i.e., ship, aircraft, ground vehicle, or communications building) will have the capability to be very easily and virtually instantly reconfigured for different combinations of modes and bands. This supports the military mission team to be able to react to changes in connectivity emphasis during a mission. For example, the primary mission might require maximum use of satellite communications (SATCOM) for beyond line of sight (LOS) communications back to a headquarters or command. However, during the same mission, increased communications to ground forces could be required to handle an emergency situation. The RFD according to the invention enables this reconfiguration instantaneously. After the emergency is handled, the RFD can be easily and instantaneously reconfigured back to the original combination of bands and modes.

A complex RFD is required to be able to provide reconfiguration capability while reducing antenna population and cosite interference. Because most military missions are high stress scenarios, controlling a complex RFD with many alternative paths between a bank of radios and a bank of antennas had to be simplified. To achieve the required simple RFD control, the invention includes a novel RCU as well as the concepts of the RCU and the "RCU/RFD Digital Dashboard" (R2 D2).

Figure 5:
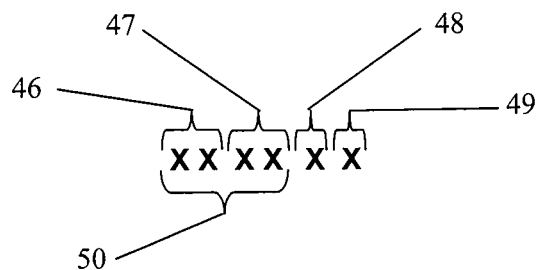
FIG. 5 is a representation of the legend for the characters that comprise the path name for each of the possible band/mode capabilities provided for each radio by the RFD according to the invention.
Figure 6:
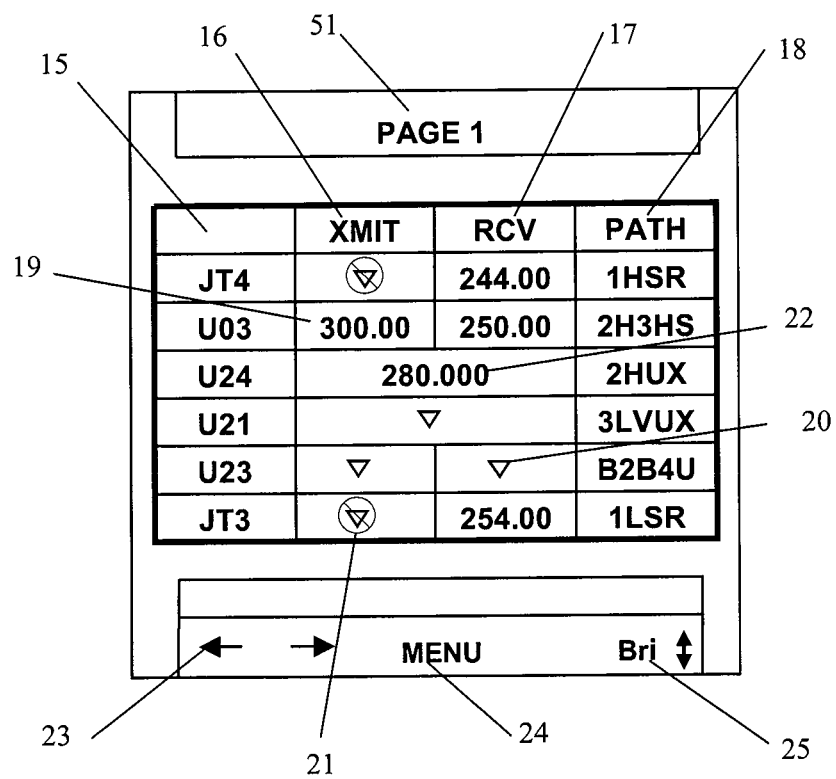
FIG. 6 is a representation a typical RCU graphical user interface display according to the invention that may also used in the R2D2.

FIG. 5 shows a suitable although non-limiting legend that may be used for generating the band/mode path name indicia shown in the full display RCU depicted in FIG. 6. In this regard, below is a list of indicators that may be used in the RCU for full display of the paths available to each radio. After the RFD architecture is designed, the radio and antenna locations are combined with the band/mode designators (shown in FIGS. 8 and 9) to list Path Names for each of the paths available for each radio in accordance with the following:
46 indicates Tx (transmitting) antenna, if separate.
47 indicates Rx (receiving) antenna, if separate.

48 indicates frequency range.

49 indicates Tx only, Rx only, or both. H for hopping, F for filter bypass, FA for filter and AMP bypassed.

50 indicates if a single antenna is used for Tx and Rx, i.e., one indication (only 2 characters).

FIG. 6 shows a typical full-display version of an RCU graphical user interface according to the invention. However, even when this information is reduced to show only Band/Mode paths as discussed later herein, the first step of creating the Band/Mode paths is preferably to list the full-display version. This first step is required as part of the engineering task to ensure complete identification of all of the RFD band/mode path selections available for each radio for each newly designed RFD. The next step, for when a user wants a more simplified RCU/R2D2 is to reduce the band/mode path names to include only the band/mode indications and not include the antenna reference.

The RCU display illustrated in FIG. 6 is constrained by the columns/rows/characters limits of an actual, but merely exemplary, RCU device that has been constructed according to the invention to physically demonstrate the features thereof. This particular example was designed as the largest display that would fit on the front face of an RCU box designed to fit within the space constraints of a standard avionics rack in an aircraft. It will be understood that such display is not limited to what is shown in FIG. 6. That is, it is contemplated that an RCU and its associated display may be designed and constructed in accordance with the present invention to accommodate any number of columns/rows/characters that an end user may desire.

Additionally, the RCU display according to the invention may be manifested in several possible ways or versions. These versions may range from showing for each of a plurality of radios, inter alia, columns for radios, transmit frequencies, receive frequencies, band, mode and RF paths through the RFD, to only showing the RF paths for the radios. Heretofore, radio control heads/displays indicated such information for only one radio. In contrast, from the perspective of its M3B RFD, the present invention shows all radios, RFD equipment and the overall configuration in one display. And, if the number of radios exceeds the number of rows in a particular RCU display page, then the RCU can be provided with additional "pages" 51 so that all radios, frequencies, bands, modes, RFD paths settings and other related and desirable information can be seen by switching between the pages. In the illustrated example, a minimum of six radios are displayed on each page, although a greater or lesser number of radios may be displayed if desired or necessary.

Referring to the RCU display page shown in FIG. 6, the display page shows in the left-most column 15 the radios that are controlled by the RCU and are passed through the RFD. Typically, for each radio from two to eight different paths may be selectable (although greater or fewer paths may be desirable or necessary).

When a path is selected, the XMIT (transmit) 16 and RCV (receive) 17 cells change to correspond to the capability of the selected path 18.

A displayed frequency number 19 indicates that a tunable filter is in that path and requires a frequency command from the RCU to match the radio frequency.

A displayed antenna symbol 20 indicates that the radio is connected to an antenna but there is no tunable filter in the path, therefore no frequency command from the RCU to the RFD is needed.

A displayed crossed-out antenna symbol 21 indicates that the radio is not connected to an antenna in that path. In the displayed example, therefore, the crossed-out antenna symbol indicates that radio JT4, path 1HSR, is only connected to a receive-only antenna.

If the frequency number or the antenna symbol is shown in the middle of both the XMIT and RCV columns (as indicated by reference numeral 22), then the radio both transmits and receives on that one path and one antenna.

Also shown in FIG. 6 are certain indicators on the display that are deployed via the RCU keypad, discussed below, for manual control and use of the RCU functions:

23 indicates left and right arrows used for lateral motion between display cells;

24 indicates a Menu used to access other functions; and

25 indicates "BRI" is used to increase or decrease the display and keyboard brightness level to suit the operator.

FIG. 6 depicts one of a virtually infinite variety of examples of RCU displays and functions. In a typical installation the RCU may contain multiple pages for display and selection from among more than 100 paths and among tens of radios, from which it issues tuning commands for frequency setting for filters, switched filter-banks, etc.

Figures 7, 8:
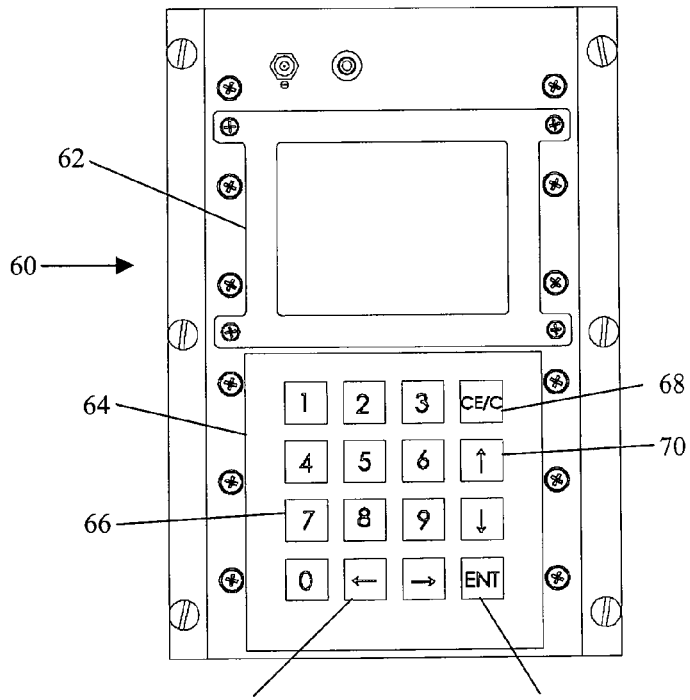
FIG. 7 is a front view of a typical RCU suitable for use in aircraft showing display columns, characters and keypad indications.
FIG. 8 is a representation of a typical chart that may be used during the design stage of the R2D2/RCU/RFD according to the invention to label and define the antenna legend portion of an RFD path name.

FIG. 7 is a graphical representation of a representative RCU according to the invention identified generally by reference numeral 60. The illustrated version of the RCU 60 is especially suitable for use in aircraft. It will be understood that a shipboard version thereof would normally be designed to fit a 19-inch wide rack and a ground-use version could use either physical configuration.

As seen in FIG. 7, RCU 60 preferably includes at least a display screen 62 and a keypad 64. Display screen 62 is operable to display RFD "pages", discussed below, which typically include several display columns and characters for several radios, antenna symbols, frequencies, path names, etc. In addition, FIG. 7 shows that keypad 64 desirably includes at least numerical keys 0-9, identified generally by reference numeral 66, a "clear entry/clear" (CE/C) key 68, up and down arrow keys 70, left and right arrow keys 72 and an "ENTER" (ENT) key 74. Additional keys and functionalities may be incorporated into keypad 64 as may be desired or necessary to fulfill the needs of the end user.

As will be appreciated, numerical keys 66 are used to enter certain numerical information into display screen 62 (such as, for example, transmit and/or receive frequencies) and CE/C key 68 is used to clear inaccurate numerical entries. Up and down arrow keys 70 are used to navigate upwardly and downwardly through the columns displayed in display screen 62 and left and right arrow keys 72 are used to move laterally (i.e., left and right) between the columns shown in the display screen. Lastly, the ENT key 74 is used to enter numerical information into display screen 62 as well as to target a cell from the display screen which is selected by a user by manipulation of one or more of the up and down arrow keys 70 and/or left and right arrow keys 72 (including, without limitation, a radio identification cell, a frequency cell, a path name cell, a MENU command cell, a brightness level command cell, and so on).

Again, there are many possible variations concerning how each item of information and function is specifically displayed and accessed/manipulated in a particular RCU configuration.

One of several bases for the successful function of the RCU, RFD and R2D2 according to the invention is development of a holistic and concise approach to label/designate the radios and antennas. Even when a more simplified expression is ultimately selected for display on the RCU and implemented in the software, a design engineer must first assign concise labels for each radio and each antenna.

The first step in this process is reflected in table 80 shown in FIG. 8. This requires preparation of a list of all of the antennas on a platform that are to be used with the RFD and then designating a Legend List that will be used to generate RFD path names. The antenna Legend List may consist, among other information, of a column 82 of antenna location information and a column 84 of antenna frequency ranges for each antenna location. From this, a third column 86 may be generated that provides an RCU designation for each antenna. It is the antenna designations from column 86 which become part of the RFD path names shown, by way of example, in column 18 of FIG. 6 which sets forth the path (i.e., path name) available for each radio. It will be appreciated that the RCU antenna path name legend or "Legend List" depicted in FIG. 8 is representative of a single, but typical, Legend List that may be generated according to the principles and objectives disclosed herein. In this regard, it will be appreciated that each field application will have its own unique antenna Legend List.

The next step in the Legend List creation process is shown in table 90 of FIG. 9. This requires preparation of a list of all of the radios that may be used on a platform and identification of all of the bands and modes associated therewith. Additionally, other associated radio-related designations are generated which also become part of the path names. More particularly, table 90 may include a radio "type" column 92 and a column 94 of radio frequency ranges for each radio. From this, a third column 96 may be generated that provides an RCU designation for each radio. Further, table 90 preferably includes additional information, some of which ultimately becomes part of the RFD path name designations shown, for example, in FIG. 6.

More particularly, table 90 may include a path frequency range column 98 from which a frequency range path designation column 100 may be generated. It is the frequency range path designations shown in column 100 which preferably become part of the RFD path name designations in accordance with the legend format discussed in connection with FIG. 5 (and shown, for example, in FIG. 6). Table 90 may also include a path function column 102 which defines the Tx (transmit) and/or Rx (receive) path designations expressed in a Tx and/or Rx path designation column 104, which designations also may become part of the RFD path name designations in accordance with the legend format discussed in connection with FIG. 5 (and shown, for example, in FIG. 6).

The RCU radio path name legend or "Legend List" depicted in FIG. 9 is representative of a single, but typical, Legend List that may be generated according to the principles and objectives disclosed herein. In this regard, it will be appreciated that each field application will have its own unique radio Legend List.

Figure 10:
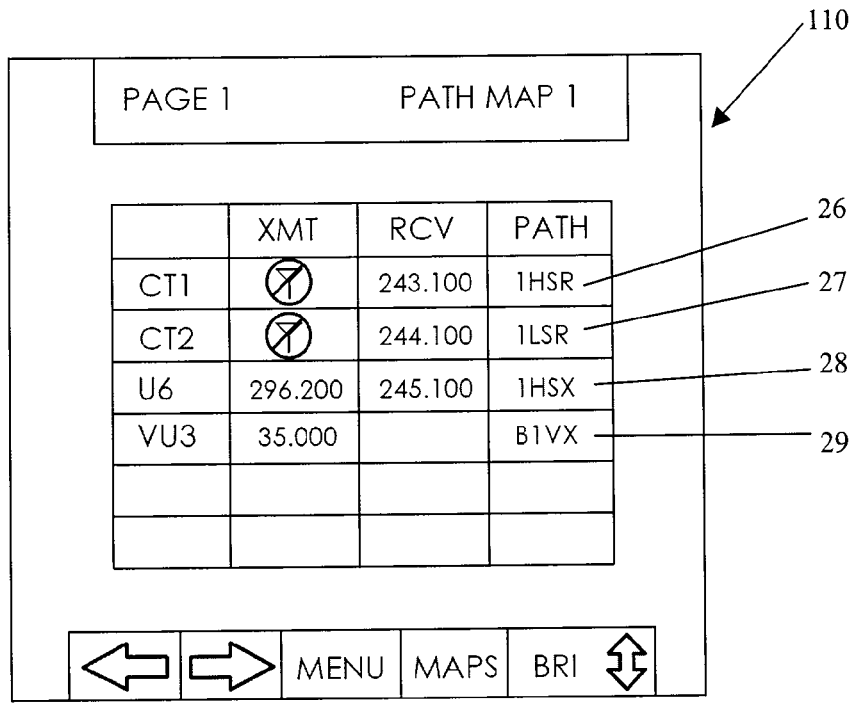
FIG. 10 is a representation of a first type of RCU display according to the invention showing the columns and characters of a main page, including antenna connections, frequency settings in the RFD, and band/mode use of each radio's selected RFD path.

FIG. 10 shows a hypothetical radio system RCU R2D2 path map display 110 according to the invention for four radios (designated as CT1, CT2, U6 and VU3, respectively). Descriptions of all of the band/mode paths 26-29 available for each radio are as follows (with only a single Path Map, "Path Map 1", being shown for each radio).

26:

| 1HSR | SATCOM filtered on high angle: | SAT HIGH |
| 1LSR | SATCOM filtered on low angle: | SAT LOW |

27:

| 1HSR | SATCOM filtered on high angle: | SAT HIGH |

-continued

| 1LSR | SATCOM filtered on low angle: | SAT LOW |

28:

| 1HSX | SATCOM filtered on high angle: | SAT HIGH |
| 1LSX | SATCOM filtered on low angle: | SAT LOW |
| 1LUX | LOS 292-318 Tx, 243-270 Rx on low: | LOS RES LOW |

29:

| B1VX | 30-174 on blade: | LOS 30-174 |
| B2ZXH | 225-512 on blade: | LOS 225-512HVQK |
| B2UX | 225-400 filtered on blade: | LOS 225-400 |
| 2HUX | 225-400 filtered on high angle: | LOS 225-400 HI |
| 2LUX | 225-400 filtered on low angle: | LOS 225-400 LO |
| 2H1HSX | SATCOM filtered on high angle: | SAT HIGH |
| 2L1LSX | SATCOM filtered on low angle: | SAT LOW |

As used herein, certain of the foregoing terms shall have the following meanings:

"filtered"=a tunable bandpass filter is provided in the RF pathway. All other paths do not have tunable filters but have harmonic suppression filters.

"on blade"=connection to a LOS Blade antenna that would be used for radio communication with an aircraft, ship or ground based radio.

"high angle"=connection to the high angle antenna that would enable communication to a satellite that is located with reference to the antenna from the horizon to about 35 degrees to the vertical.

"low angle"=connection to the low angle antenna that would enable communication to a satellite that is located with reference to the antenna from about 35 degrees to vertical, in which the satellite would be directly overhead.

Lastly, the frequencies on the display are the frequency setting of the respective radio.

Figure 11:
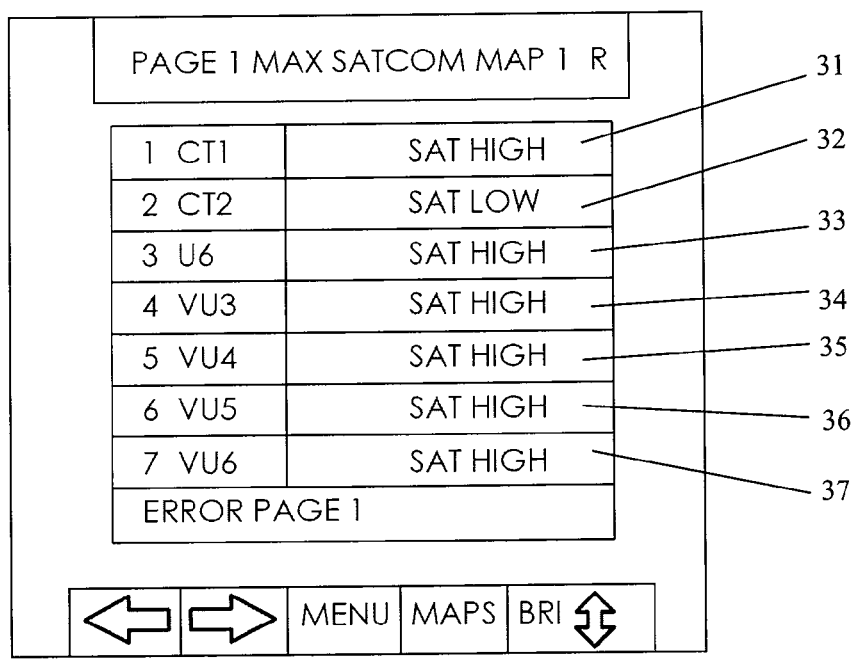
FIG. 11 is a representation of a second type of RCU display according to the invention showing the columns and characters of a main page, including only the band/mode use of each radio, which is suitable for use by customers/end users who want only minimum information displayed on the RCU.

As mentioned above, in many applications the end user may want the path names further simplified to show a minimal indication of RF band/mode. An example of the simplified RF band/mode indication is shown in FIG. 11 in which the page of RF band/mode connection paths is labeled MAX SATCOM MAP 1. Upon clicking on each of the radios, a path list opens in a new window to show all of the possible paths for that radio. As an example, the lists of RF band/mode connection paths for each radio could show the following as noted in FIG. 11.

31:
SAT HIGH
SAT LOW
32:
SAT HIGH
SAT LOW
33:
SAT HIGH
SAT LOW
34:
LOS 30-174
LOS 225-512 HV QK
LOS 225-400
LOS 225-400 HI
LOS 225-400 LO
SAT HIGH
SAT LOW
35:
LOS 30-174
LOS 225-512 HV QK
LOS 225-400
LOS 225-400 HI
LOS 225-400 LO

SAT HIGH
SAT LOW
36:
LOS 30-174
LOS 225-512
LOS 225-400
LOS HV QK
LOS 225-400 LO
LOS 225-400 HI
SAT HIGH
SAT LOW
37:
LOS 30-174
LOS 225-512
LOS 225-400
LOS HV QK
LOS 225-400 LO
LOS 225-400 HI
SAT HIGH
SAT LOW

Figure 12:
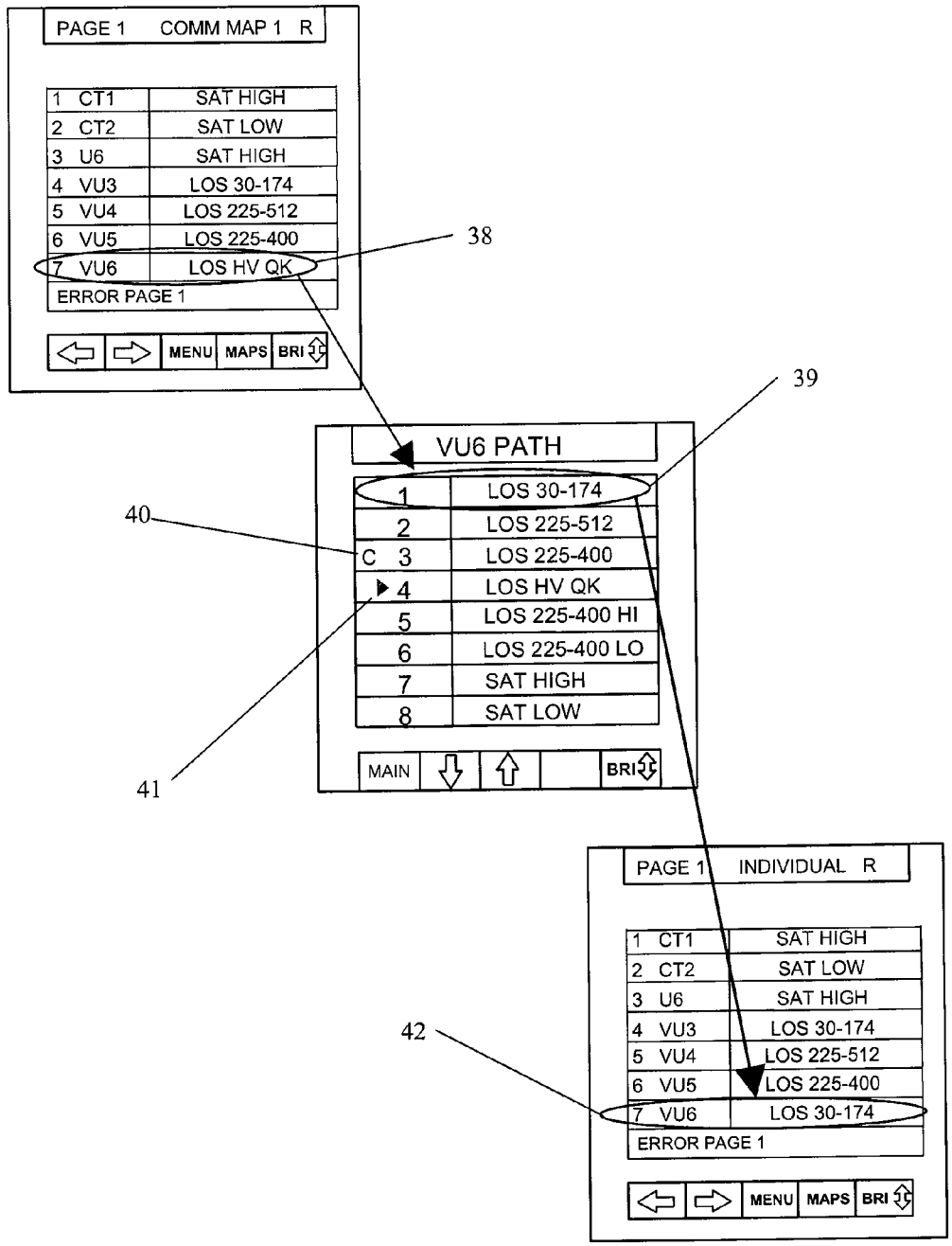
FIG. 12 is a sequential representation of the second type of RCU display showing a simple "3-click" sequence of the RCU/R2D2 to change the band/mode RFD setting of an individual radio.
Figure 13:
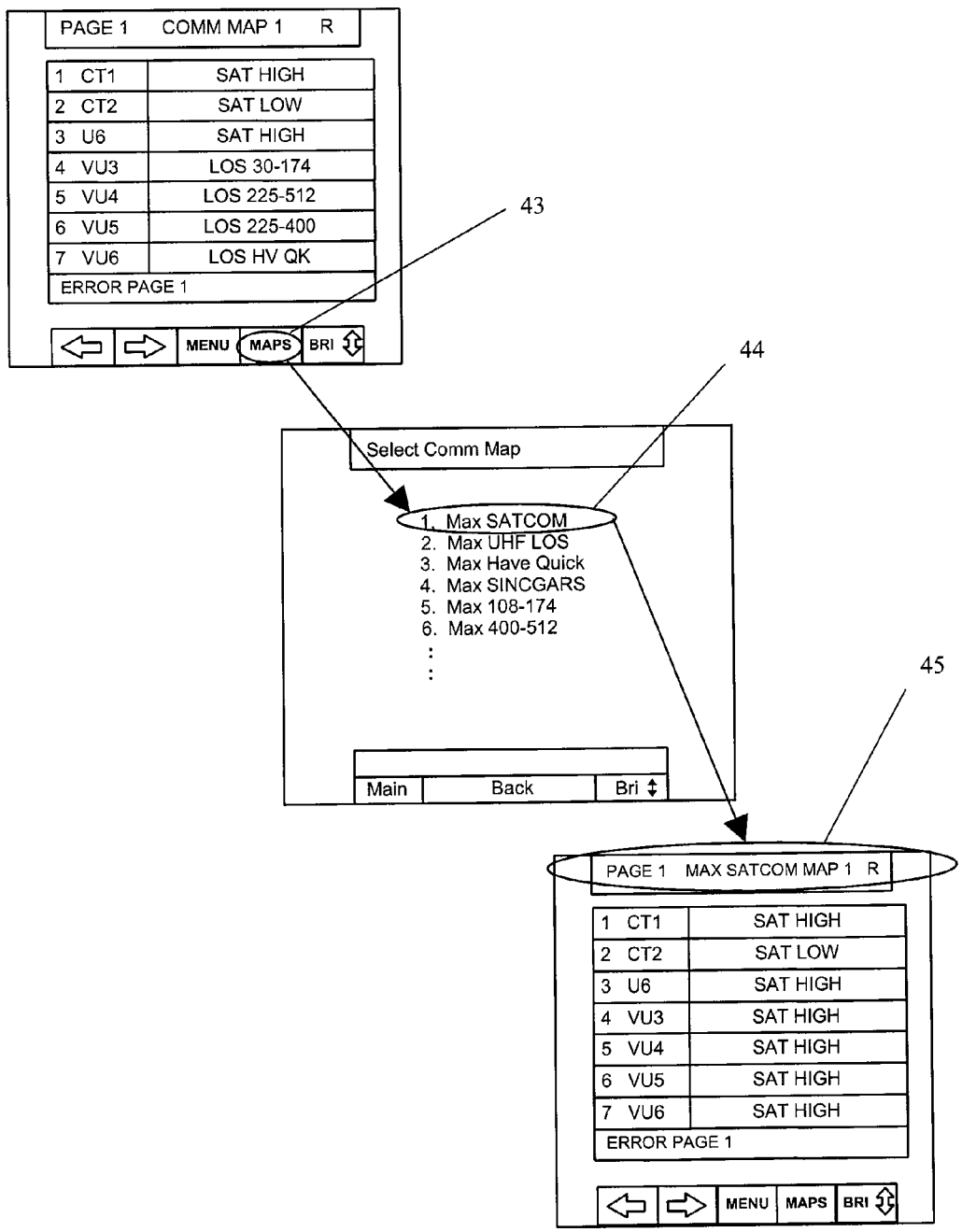
FIG. 13 is a sequential representation of the second type of RCU display showing a simple "3-click" sequence of the RCU/R2D2 to change the band/mode RFD settings for all of the radios connected to the RFD (known as either a Path Map change or a Comm Plan change)

As seen in FIGS. 12 and 13, there are two ways to quickly change the paths using the RCU according to the invention:
1. Path selection for each radio, one radio at a time (FIG. 12).
2. Path maps to change paths for all radios at same time (FIG. 13).
1. RCU Path Selection by Radio:

Referring to FIG. 12, as represented at reference numeral 38, a user first highlights a radio (e.g., the VU6 radio) in a first window (PAGE 1 COMM MAP 1) for which a different band/mode path is desired and then clicks the ENTER key 74 of the RCU (FIG. 7). Upon clicking ENTER, a second window (VU6 PATH LIST) opens to show the available path list for radio VU6. A "C" (reference numeral 40) in the path list indicates paths not available because they are in use by other radios. The presence of a triangle (reference numeral 41) in the path list indicates the currently connected path (i.e., LOS HV QK). The user then highlights, at 39, a desired path (e.g., LOS 30-174) and then clicks ENTER. Assuming no conflicts for this path exist, the radio VU6 path will be changed and the RCU will return to PAGE 1 to show the newly selected band/mode path 42 (i.e., LOS 30-174). The top of the page will also preferably display "INDIVIDUAL" to indicate that a single radio was changed and that a PATH MAP was not selected. Consequently, as reflected in FIG. 12, the RCU according to the invention enables a user to select in only two steps any of a plurality of different bands and modes paths (in the illustrated example, eight paths) that may be available to a particular radio.

2. Path Selection by Path Map:

Referring to FIG. 13, as represented at reference numeral 43 a user first highlights "MAPS" in a first window (PAGE 1 COMM MAP 1) for which a different path map for a plurality of radios is desired and then clicks the ENTER key 74 of the RCU (FIG. 7). Upon clicking ENTER, a second window (Select Comm Map) opens to show the available PATH MAP list. The user then highlights, at 44, the desired PATH MAP from the list (e.g., MAX SATCOM) and clicks ENTER. The RCU will then immediately reconfigure the RFD and return to Page 1. The selected Path Map name and number, which in this instance are MAX SATCOM MAP 1, are displayed at the top of Page 1, as represented by reference numeral 45, and each of the individual radio paths are changed in accordance with the selected Path Map. Consequently, as reflected in FIG. 13, the RCU according to the invention enables a user to select in only two steps any of a plurality of different Path Maps that may be available to a plurality of radios.

Figure 14:
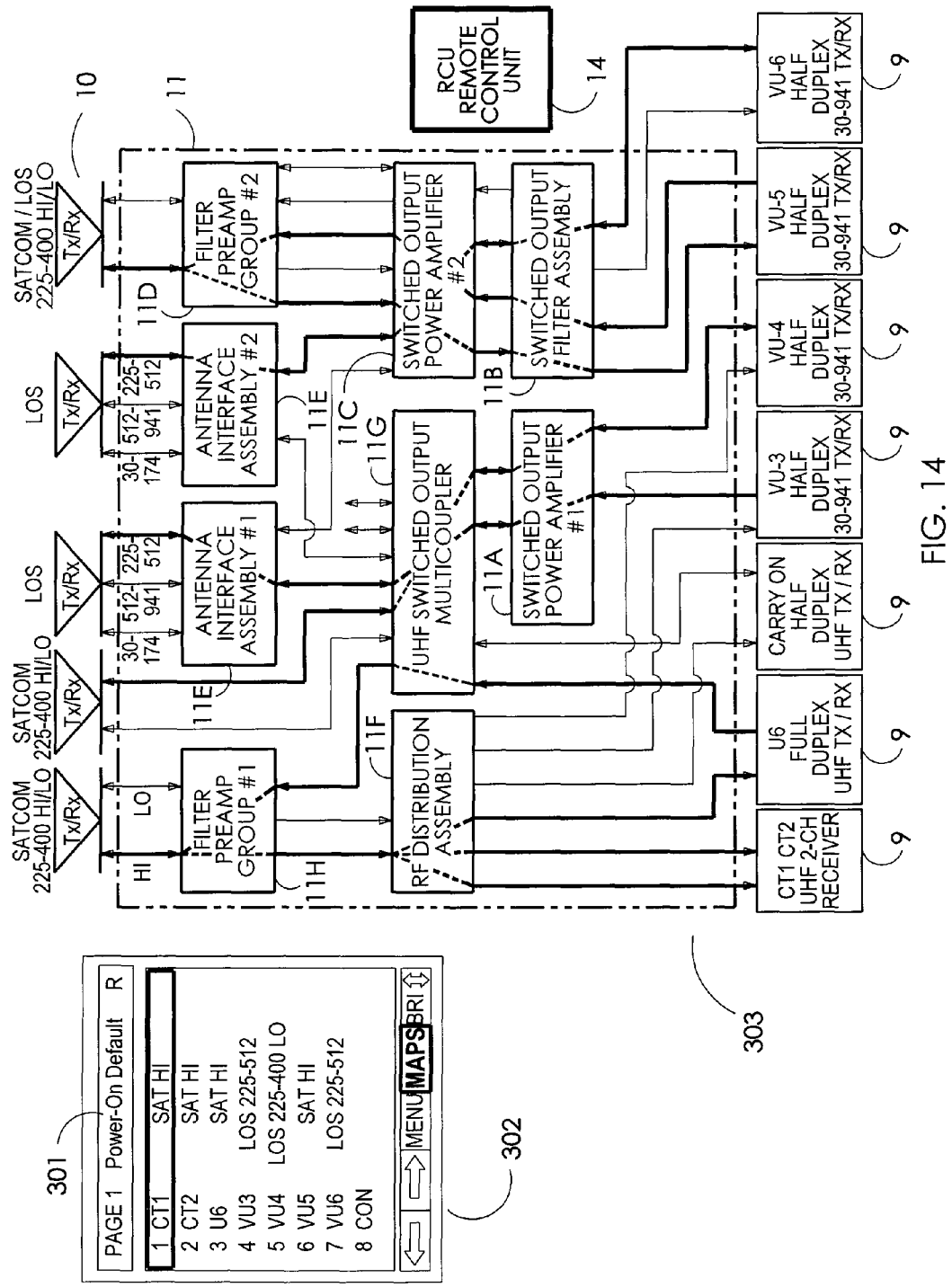

Subsequently described figures depict the information conveyed by and how one interacts with the R2D2 according to the invention. In this connection, FIGS. 14-19 depict how one would go about changing the Path Maps for an individual radio. Turning to FIG. 14, when the R2D2 first boots, it displays the "Power-On Default" (POD) Path Map. The POD Path Map mode and setting of the R2D2 is listed in the top display cell 301 of the virtual RCU display 302 which is shown on the operator's computer screen. The actual Path Map block diagram 303 which, for illustrative purposes only, corresponds to the exemplary RFD system architecture shown in FIG. 3, is also concurrently displayed on the R2D2 screen. This block diagram shows all of the RF connections from the radios, through the RFD components, to the antennas. The line paths in the block diagram 303 show the connections that are also listed in the virtual RCU display 302. The POD Path Map is designed to include the Band/Mode selections for each radio that a customer can request to be designed into the system specifically for its platform. The POD Path Map provides the communications combination that is required when the mission suite is first powered on.

In this example, assume the operator wants to change the band/mode operation of the radio designated as VU3. To enable this radio to operate in a different band/mode, the operator must cause the RCU/RFD to change the path through the RFD. Toward that end, and as shown in FIG. 15, the operator clicks on the VU3 radio 304.

Figure 16:
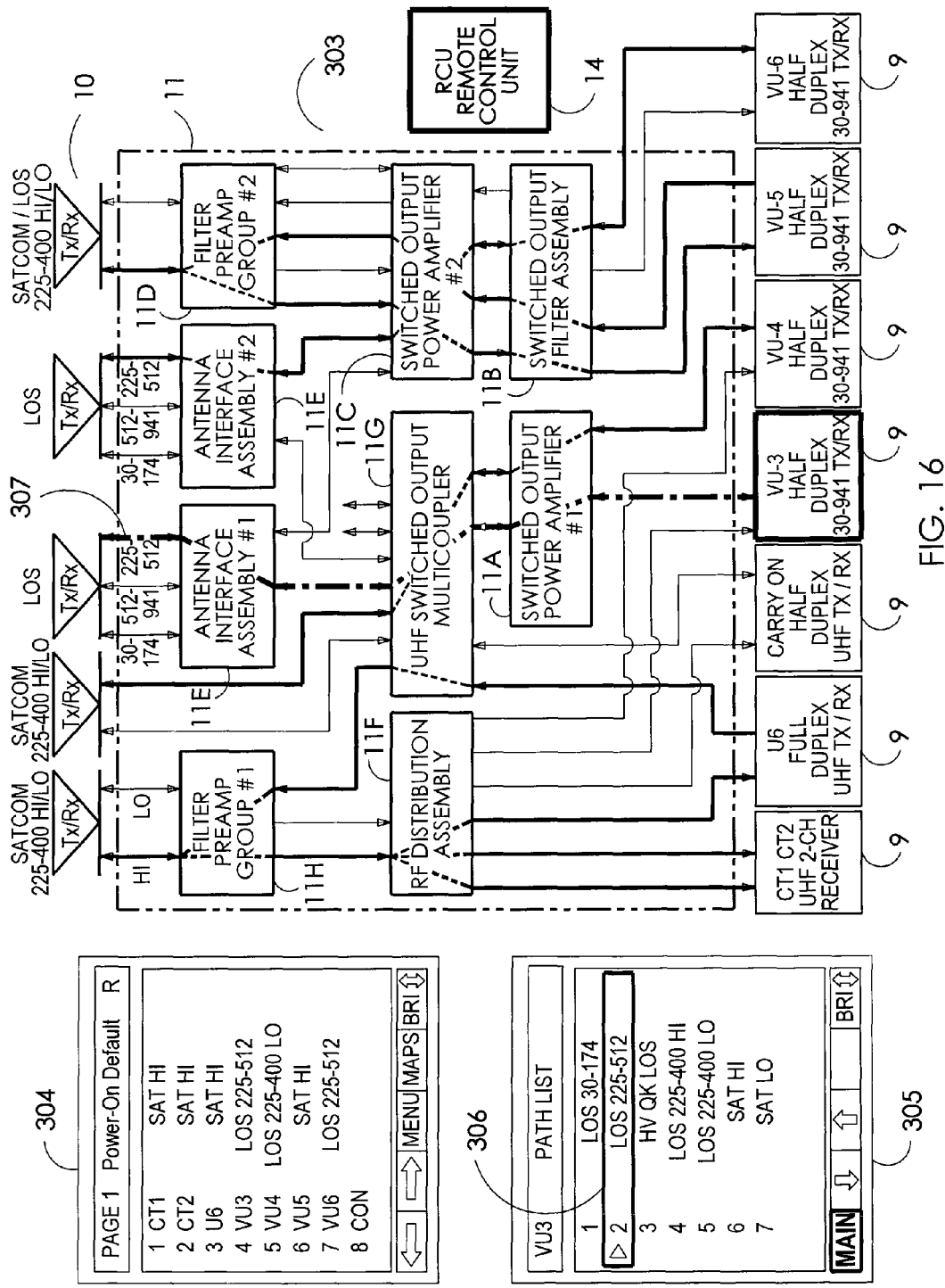
FIG. 16 is a representation of the second type of RCU/R2D2 display showing the results of the first click of the 3-click sequence.

Upon clicking on the VU3 radio in FIG. 15, FIG. 16 shows that a second display window 305 opens below the first display window. Second window 305 displays all of the band/mode paths available for radio VU3 with the current band/mode path (LOS 225-512) highlighted with a triangle, as represented by numeral 306. Concurrently, the associated block diagram 303 also now shows the current VU3 path in bold and in dot-dash line 307. Note that the original RCU display 304 window remains above the second window 305. Also note, however, that window 304 remains dynamic and will simultaneously show all changes made in the lower display window 305.

Figure 17:
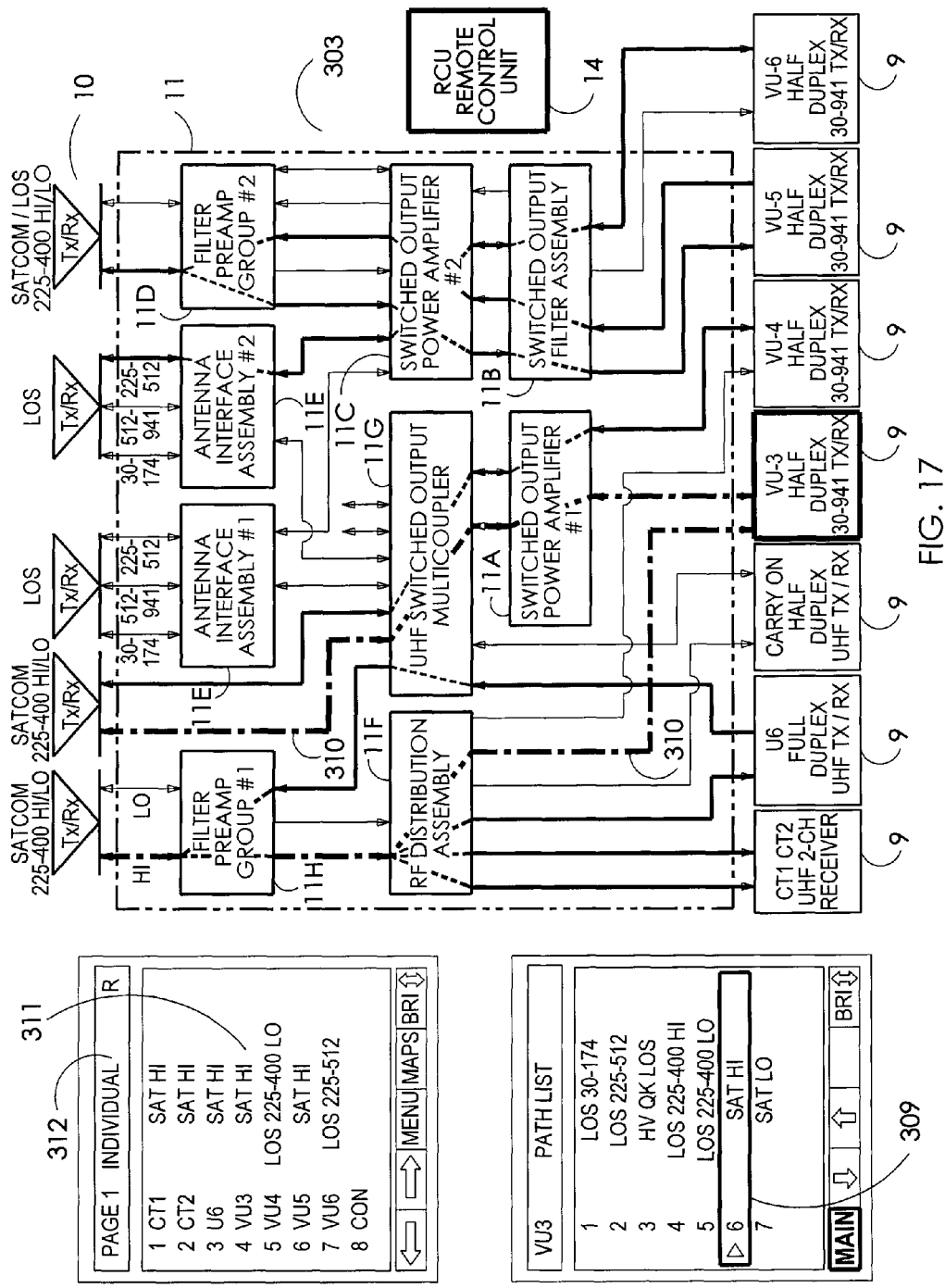
FIG. 17 is a representation of the second type of RCU/R2D2 display showing the second click of the 3-click sequence to change the band/mode RFD setting for an individual radio.

In FIG. 17 of the instant example, the operator changes the VU3 radio operation from LOS 225-512 to SAT HI by clicking on SAT HI path 309. Concurrently, the associated block diagram 303 also now shows the current VU3 paths in bold and in dot-dash lines 310. The operator need only be concerned with selecting the desired Band/Mode. The RFD according to the invention is designed to switch to the correct path to enable operation in the desired Band/Mode. Note that the change in the VU3 radio path selected in the bottom display window is simultaneously changed in the top display window as indicated by reference numeral 311. Also note that the title line 312 on the top display window shows "INDIVIDUAL" which indicates that the list of band/modes for each radio is now based on individual selection and not a PATH MAP. This interactive total picture (two display windows and block diagram) shows the operator exactly how the platform comms are configured in both list and diagram formats and for both individual radio paths as well as for the entire radio suite.

Figure 18:
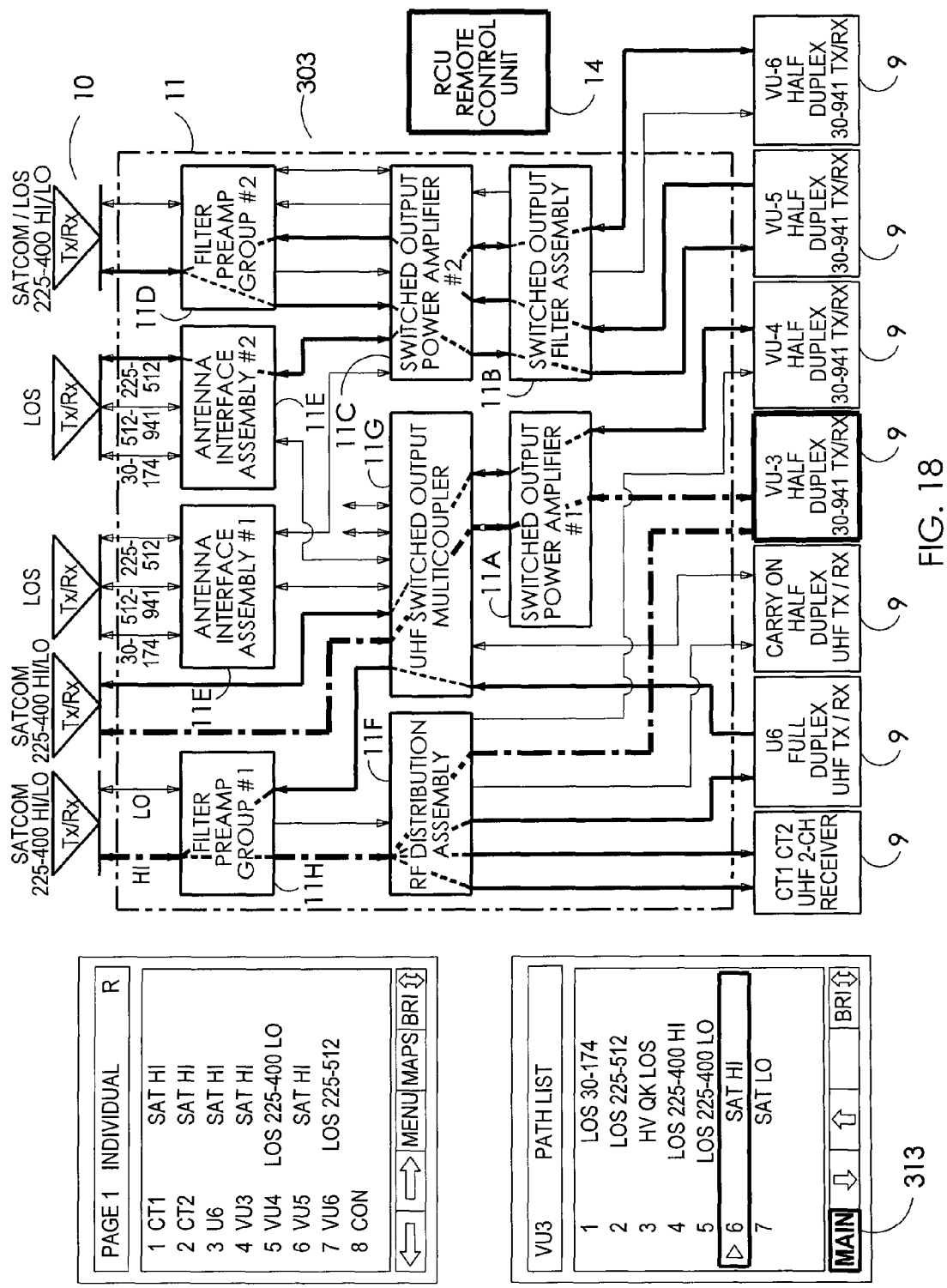
FIG. 18 is a representation of the second type of RCU/R2D2 display showing the third click of the 3-click sequence to change the band/mode RFD setting for an individual radio.

FIG. 18 illustrates that, after the operator is satisfied with the path list selection, the MAIN button 313 on the bottom display window is clicked whereupon the bottom display window disappears as shown in FIG. 19.

FIGS. 20-27 depict how one would go about changing the Path Maps for all radios at one time. As presently constructed, the RCU according to the invention has the capability to store up to 20 burned-in PATH MAPS. Each path map is a combination of band/mode selections for each radio. It will be understood, however, that the RCU may be configured to store more than 20 PATH MAPS depending on customer need.

Figure 20:
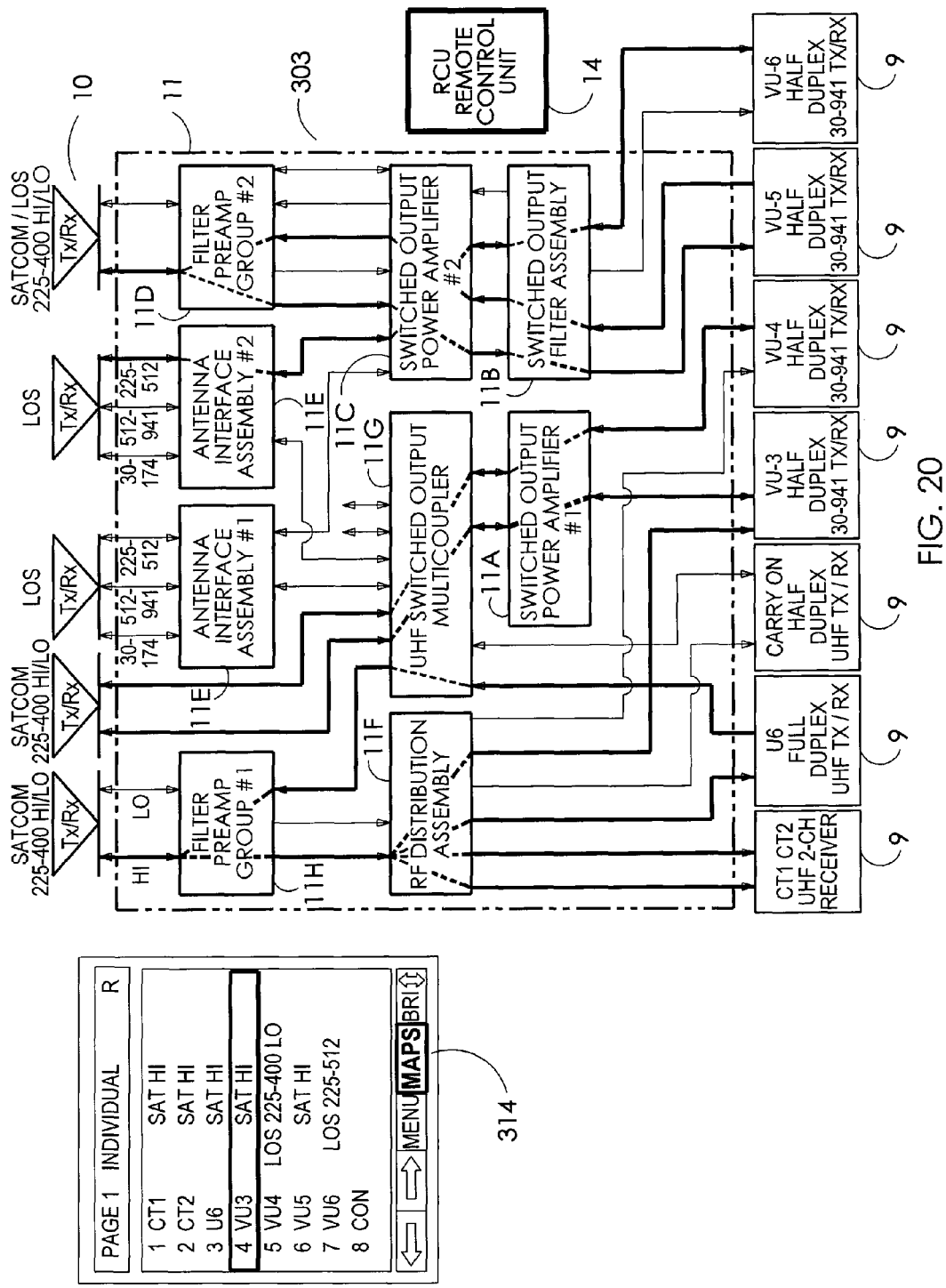
FIG. 20 is a representation of the second type of RCU/R2D2 display showing the first click of the 3-click sequence to change the "PATH MAP"

To demonstrate how systemic radio path changes are effectuated, one may begin by starting with the FIG. 19 configuration. With this configuration as a starting point, when the operator clicks on the "MAPS" key or button 314 as shown in FIG. 20, a second window 315 appears below the first window, as shown in FIG. 21. This window (Select Path Map, reference numeral 316) displays the list of all possible Path Maps 317 available to the system. Concurrently, the block diagram 303 shows the current band/mode paths that match top virtual display window that shows the band/mode path names for each radio.

Figure 22:
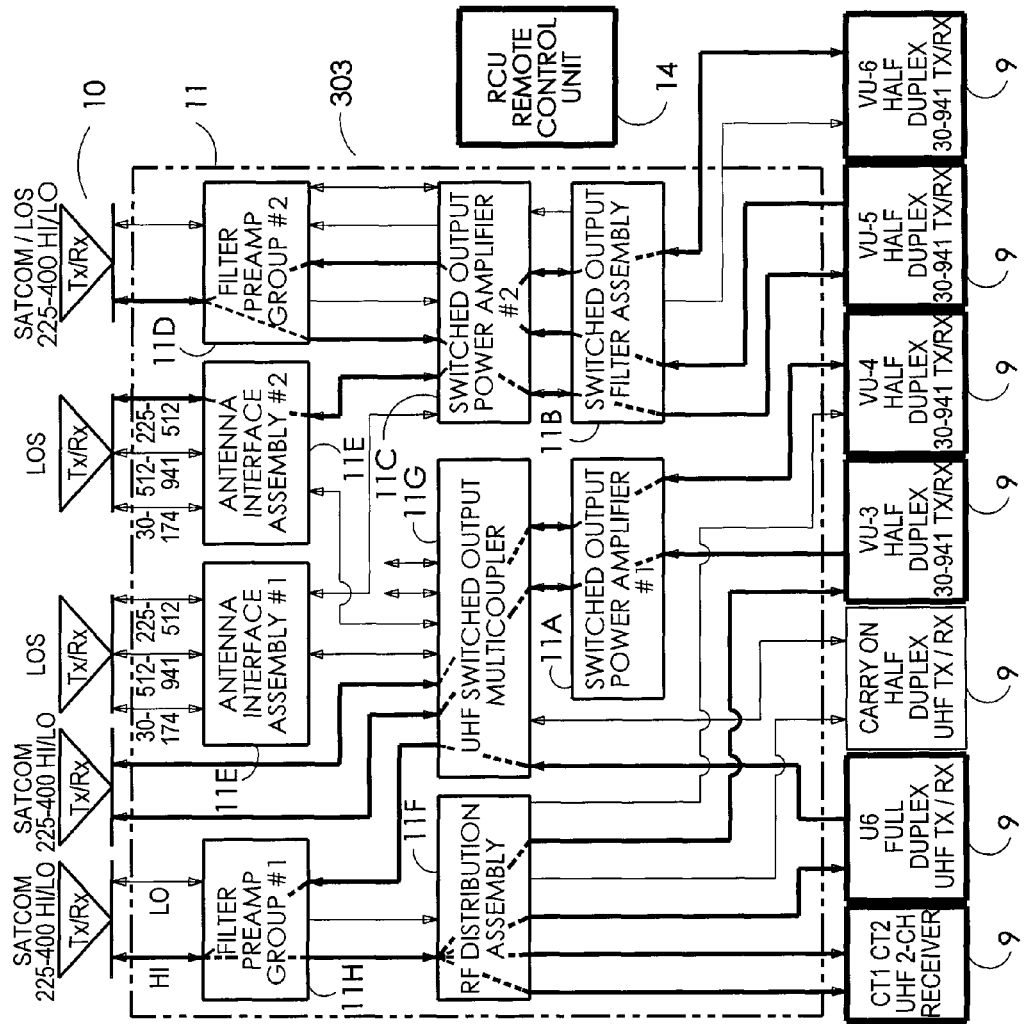
FIG. 22 is a representation of the second type of RCU/R2D2 display showing the second click of the 3-click PATH MAP selection sequence.
Figure 24:
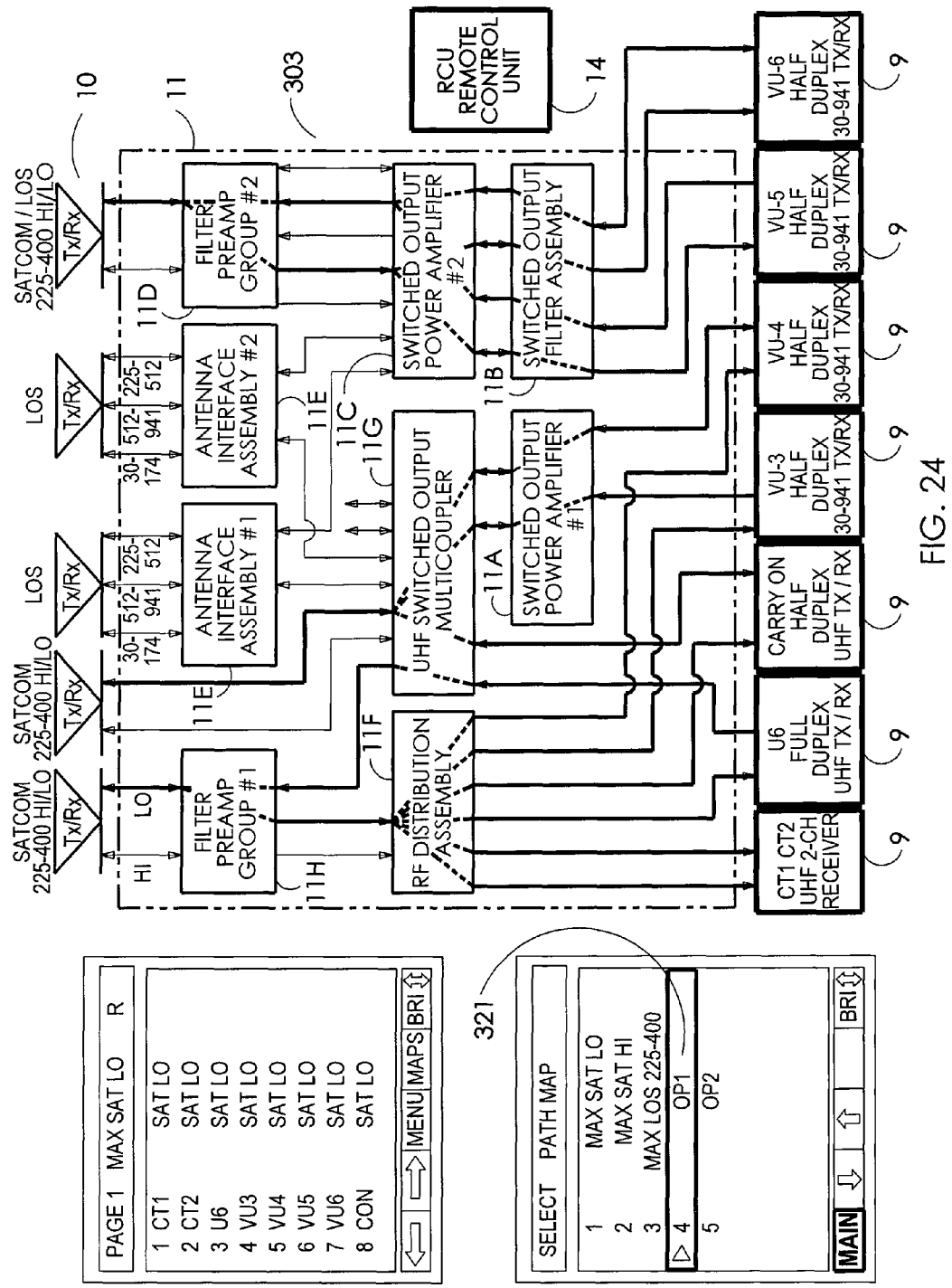
FIG. 24 is a representation of the second type of RCU/R2D2 display showing an alternative PATH MAP selection for the second click of the 3-click PATH MAP selection sequence.

When the operator selects one of the Path Maps, the entire RFD is instantly reconfigured. In the present example, as shown in FIG. 22, the operator clicks on Path Map 1, MAX SAT LO, reference numeral 318.

Upon selecting Path Map MAX SAT LO, the individual paths are simultaneously and immediately changed in the block diagram 303 to show each path of the selected path map, as reflected in FIG. 23. Simultaneously, the top line 319 of the bottom display window is highlighted with a triangle to indicate the selected PATH MAP and the individual path for each radio is shown in the block diagram and in the top display window 320.

The operator can switch to another PATH MAP (indeed any of the other PATH MAPS supported by the system) before making a final selection. This enables the operator to change his or her mind, or prevent a selection error before actually making the final reconfiguration of the radio system. To demonstrate this functionality FIG. 24 reveals that the operator may click on another path map, e.g., Path Map OP1, as indicated by reference numeral 321.

Figure 25:
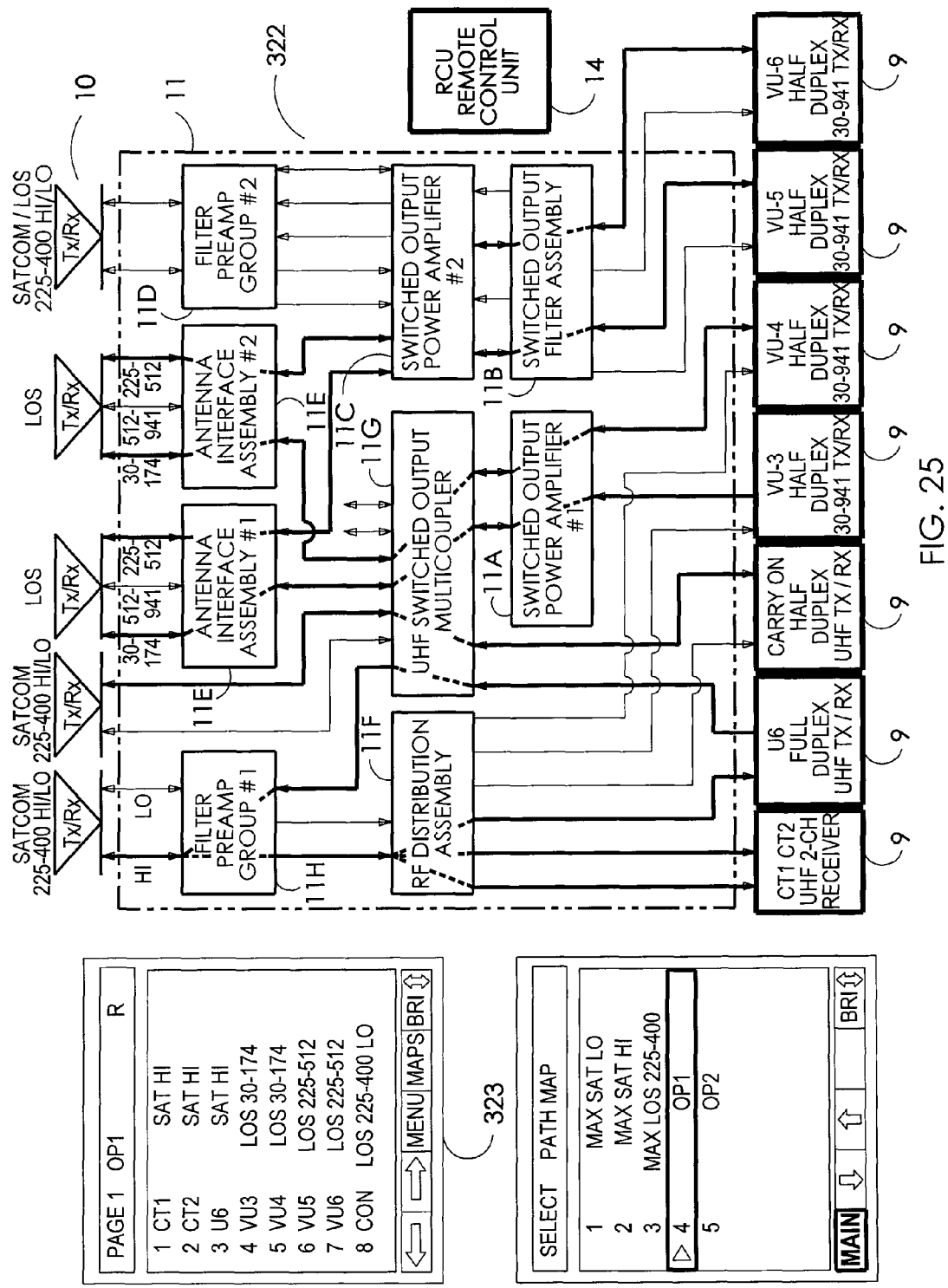
FIG. 25 is a representation of the second type of RCU/R2D2 display showing the result of the second click for selection of the OP1 PATH MAP.

The result of clicking on Path Map OP1 is illustrated in FIG. 25 which shows the new block diagram 322 and the paths for each radio that comprise the OP1 combination, as reflected by reference numeral 323 directed to the upper window "PAGE 1 OP1".

As seen in FIG. 26, the next step is for the operator to click on MAIN button 324. As a result of this click, as shown in FIG. 27, the bottom display window is closed and the top display window remains, showing the new PATH MAP (OP1), reference numeral 325, and the new band/mode for each radio 326.

The R2D2 then stands ready to accept a repeat of the above-described operator control operations to change any individual radio for different band/modes or to change any of the several different Path Maps. In any event, the changes are shown as they happen in real time.

The foregoing descriptions and their accompanying figures reflect changes to each radio or all of the radios that can be accomplished in three clicks. However, the last click is not absolutely necessary but is included for demonstrative purposes as a last check to ensure that the new band/mode/path selection is correct. For experienced operators more sure of their selection process, the RCU and the R2D2 process can be reduced to only two clicks. In either case, the RFD/RCU/R2D2 contains built-in controls to prevent damage from operator error.

In addition, the above examples describe a few limited radio path changes and Path Map changes. There are many different conceivable combinations of individual radio paths. For instance, each military aircraft, ship or communications building can have a different overall radio/RFD system architecture. The system according to the invention provides the same benefits to all architectures.

As disclosed herein, when accessed via the R2D2, the operator's computer will show not only the virtual RCU display, but also the overall block diagram of the respective military platform radio system. These diagrams show all of the radios, antennas, and all major components in between the radios and antennas. All alternative RF paths between the radios and the antennas are shown in the diagrams with user-selected paths being shown in contrasting line characteristics. In an actual implementation, the user-selected paths may be also be displayed in bold and/or contrasting color.

This present system can be used in several ways: (1) on the military platform in actual mission use, (2) in a desktop for mission planning, (3) in a training class setup, and (4) in a repair facility.

Moreover, an R2D2 has been developed which is critical to enabling pending customers to understand the capabilities of the instant RCU/RFD design for their specific platforms. Among its many advantages, the sample R2D2 replaces typical 40 to 60 page paper presentations that are normally required of conventional technical proposals.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A system for configuring communication paths in a radio communications system including a plurality of radios, a plurality of antennas and radio frequency distribution communications equipment in communication with the plurality of radios and the plurality of antennas, said system comprising:
 a graphical user interface display window including a list of a plurality of radios and a list of paths by which the plurality of radios communicates with the plurality of antennas via the radio frequency distribution communications equipment; and
 means for changing at least one path displayed in said display window,
 wherein the paths displayed by said display window comprise path names, and wherein said path names comprise indicia identifying at least one antenna in communication with each of the plurality of radios.

2. The system of claim 1 wherein said means for changing at least one path is operable to simultaneously change all paths displayed in said display window.

3. The system of claim 1 wherein said indicia comprise indicia identifying a plurality of antennas in communication with each of the plurality of radios.

4. The system of claim 1 wherein the paths displayed by said display window comprise RF bands/modes.

5. A system for configuring communication paths in a radio communications system including a plurality of radios, a plurality of antennas and radio frequency distribution communications equipment in communication with the plurality of radios and the plurality of antennas, said system comprising:
 a graphical user interface display window including a list of a plurality of radios and a list of paths by which the plurality of radios communicates with the plurality of antennas via the radio frequency distribution communications equipment; and
 means for changing at least one path displayed in said display window,
 wherein the paths displayed by said display window comprise path names, and wherein said path names comprise path frequency range indicia.

6. A system for configuring communication paths in a radio communications system including a plurality of radios, a plurality of antennas and radio frequency distribution communications equipment in communication with the plurality of radios and the plurality of antennas, said system comprising:
- a graphical user interface display window including a list of a plurality of radios and a list of paths by which the plurality of radios communicates with the plurality of antennas via the radio frequency distribution communications equipment; and
- means for changing at least one path displayed in said display window,
- wherein the paths displayed by said display window comprise path names, and wherein said path names comprise path function indicia.

7. A system for configuring communication paths in a radio communications system including a plurality of radios, a plurality of antennas and radio frequency distribution communications equipment in communication with the plurality of radios and the plurality of antennas, said system comprising:
- a graphical user interface display window including a list of a plurality of radios and a list of paths by which the plurality of radios communicates with the plurality of antennas via the radio frequency distribution communications equipment;
- a block diagram including a plurality of radios, a plurality of antennas and paths by which the plurality of radios communicates with the plurality of antennas via the radio frequency distribution communications equipment; and
- means for changing at least one path displayed in said display window and said block diagram,
- wherein the paths displayed by said display window comprise path names, and wherein said path names comprise indicia identifying at least one antenna in communication with each of the plurality of radios.

8. The system of claim 7 wherein said means for changing at least one path is operable to simultaneously change all paths displayed in said display window and in said block diagram.

9. The system of claim 7 wherein said indicia comprise indicia identifying a plurality of antennas in communication with each of the plurality of radios.

10. The system of claim 7 wherein the paths displayed by said display window comprise RF bands/modes.

11. A system for configuring communication paths in a radio communications system including a plurality of radios, a plurality of antennas and radio frequency distribution communications equipment in communication with the plurality of radios and the plurality of antennas, said system comprising:
- a graphical user interface display window including a list of a plurality of radios and a list of paths by which the plurality of radios communicates with the plurality of antennas via the radio frequency distribution communications equipment;
- a block diagram including a plurality of radios, a plurality of antennas and paths by which the plurality of radios communicates with the plurality of antennas via the radio frequency distribution communications equipment; and
- means for changing at least one path displayed in said display window and said block diagram,
- wherein the paths displayed by said display window comprise path names, and wherein said path names comprise path frequency range indicia.

12. A system for configuring communication paths in a radio communications system including a plurality of radios, a plurality of antennas and radio frequency distribution communications equipment in communication with the plurality of radios and the plurality of antennas, said system comprising:
- a graphical user interface display window including a list of a plurality of radios and a list of paths by which the plurality of radios communicates with the plurality of antennas via the radio frequency distribution communications equipment;
- a block diagram including a plurality of radios, a plurality of antennas and paths by which the plurality of radios communicates with the plurality of antennas via the radio frequency distribution communications equipment; and
- means for changing at least one path displayed in said display window and said block diagram,
- wherein the paths displayed by said display window comprise path names, and wherein said path names comprise path function indicia.

13. A method for configuring communication paths in a radio communications system including a plurality of radios, a plurality of antennas and radio frequency distribution communications equipment in communication with the plurality of radios and the plurality of antennas, said method comprising the steps of:
- providing a graphical user interface display window including a list of a plurality of radios and a list of paths by which the plurality of radios communicates with the plurality of antennas via the radio frequency distribution communications equipment; and
- changing at least one path displayed in said display window,
- wherein the paths displayed by said display window comprise path names, and wherein said path names comprise indicia identifying at least one antenna in communication with each of the plurality of radios.

14. The method of claim 13 wherein said changing step comprises simultaneously changing all paths displayed in said display window.

15. The method of claim 13 wherein said indicia comprise indicia identifying a plurality of antennas in communication with each of the plurality of radios.

16. The method of claim 13 wherein the paths displayed by said display window comprise RF bands/modes.

17. A method for configuring communication paths in a radio communications system including a plurality of radios, a plurality of antennas and radio frequency distribution communications equipment in communication with the plurality of radios and the plurality of antennas, said method comprising the steps of:
- providing a graphical user interface display window including a list of a plurality of radios and a list of paths by which the plurality of radios communicates with the plurality of antennas via the radio frequency distribution communications equipment; and
- changing at least one path displayed in said display window,
- wherein the paths displayed by said display window comprise path names, and wherein said path names comprise path frequency range indicia.

18. A method for configuring communication paths in a radio communications system including a plurality of radios, a plurality of antennas and radio frequency distribution communications equipment in communication with the plurality of radios and the plurality of antennas, said method comprising the steps of:

providing a graphical user interface display window including a list of a plurality of radios and a list of paths by which the plurality of radios communicates with the plurality of antennas via the radio frequency distribution communications equipment; and changing at least one path displayed in said display window, wherein the paths displayed by said display window comprise path names, and wherein said path names comprise path function indicia.

19. A method for configuring communication paths in a radio communications system including a plurality of radios, a plurality of antennas and radio frequency distribution communications equipment in communication with the plurality of radios and the plurality of antennas, said method comprising the steps of:

providing a graphical user interface display window including a list of a plurality of radios and a list of paths by which the plurality of radios communicates with the plurality of antennas via the radio frequency distribution communications equipment;

providing a block diagram including a plurality of radios, a plurality of antennas and paths by which the plurality of radios communicates with the plurality of antennas via the radio frequency distribution communications equipment; and changing at least one path displayed in said display window and said block diagram, wherein the paths displayed by said display window comprise path names, and wherein said path names comprise indicia identifying at least one antenna in communication with each of the plurality of radios.

20. The method of claim 19 wherein said changing step comprises simultaneously changing all paths displayed in said display window and in said block diagram.

21. The method of claim 19 wherein said indicia comprise indicia identifying a plurality of antennas in communication with each of the plurality of radios.

22. The method of claim 19 wherein the paths displayed by said display window comprise RF bands/modes.

23. A method for configuring communication paths in a radio communications system including a plurality of radios, a plurality of antennas and radio frequency distribution communications equipment in communication with the plurality of radios and the plurality of antennas, said method comprising the steps of:

providing a graphical user interface display window including a list of a plurality of radios and a list of paths by which the plurality of radios communicates with the plurality of antennas via the radio frequency distribution communications equipment;

providing a block diagram including a plurality of radios, a plurality of antennas and paths by which the plurality of radios communicates with the plurality of antennas via the radio frequency distribution communications equipment; and changing at least one path displayed in said display window and said block diagram, wherein the paths displayed by said display window comprise path names, and wherein said path names comprise path frequency range indicia.

24. A method for configuring communication paths in a radio communications system including a plurality of radios, a plurality of antennas and radio frequency distribution communications equipment in communication with the plurality of radios and the plurality of antennas, said method comprising the steps of:

providing a graphical user interface display window including a list of a plurality of radios and a list of paths by which the plurality of radios communicates with the plurality of antennas via the radio frequency distribution communications equipment;

providing a block diagram including a plurality of radios, a plurality of antennas and paths by which the plurality of radios communicates with the plurality of antennas via the radio frequency distribution communications equipment; and changing at least one path displayed in said display window and said block diagram, wherein the paths displayed by said at least one window comprise path names, and wherein said path names comprise path function indicia.

\* \* \* \* \*